US011304139B2

(12) United States Patent
Nam et al.

(10) Patent No.: US 11,304,139 B2
(45) Date of Patent: Apr. 12, 2022

(54) WAKE-UP SIGNAL ASSISTED LINK MANAGEMENT

(71) Applicant: QUALCOMM Incorporated, San Diego, CA (US)

(72) Inventors: Wooseok Nam, San Diego, CA (US); Tao Luo, San Diego, CA (US); Peter Pui Lok Ang, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/909,872

(22) Filed: Jun. 23, 2020

(65) Prior Publication Data

US 2020/0413340 A1 Dec. 31, 2020

Related U.S. Application Data

(60) Provisional application No. 62/867,856, filed on Jun. 27, 2019.

(51) Int. Cl.
*H04W 52/02* (2009.01)
*H04W 24/10* (2009.01)
(Continued)

(52) U.S. Cl.
CPC ....... *H04W 52/0229* (2013.01); *H04W 24/10* (2013.01); *H04W 76/11* (2018.02); *H04W 76/28* (2018.02)

(58) Field of Classification Search
CPC . H04W 52/0229; H04W 76/28; H04W 76/11; H04W 24/10
(Continued)

(56) References Cited

U.S. PATENT DOCUMENTS

| 9,872,252 B1 * | 1/2018 | Ang ................. H04W 52/0229 |
| 2018/0027495 A1 * | 1/2018 | Song .................... G06F 1/3206 |
| | | 455/343.2 |

(Continued)

OTHER PUBLICATIONS

Intel Corporation: "On PDCCH-Based Power Saving Signal", 3GPP Draft, 3GPP TSG-RAN WG1 #96bis, R1-1904317, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 3, 2019 (Apr. 3, 2019), XP051707187, 8 pages, Retrieved from the Internet: URL: http://www.3gpp.org/ftp/tsg%5Fran/WG1%5FRL1/TSGR1% 5F96b/Docs/R1%2D1904317%2Ezip. [retrieved on 2819-84-83] paragraph [2 .1.1]—paragraph [2.1.5] paragraph [2. 2 .1]—paragraph [2. 2. 2] paragraph [82. 3].

(Continued)

*Primary Examiner* — Mong-Thuy T Tran
(74) *Attorney, Agent, or Firm* — Holland & Hart LLP

(57) ABSTRACT

Methods, systems, and devices for wireless communications are described to enable a base station to trigger link management for a user equipment (UE) via a wake up message (e.g., wake-up signal (WUS)). The base station may transmit a WUS to the UE as part of discontinuous reception operations and may indicate, via a link management triggering field of the WUS, one or more link management procedures to perform. The link management triggering field may refer to one or more indices in a table of reference signals (RSs) of a system, in a table of RSs for WUSs, or both. The UE may receive the WUS and may use the link management triggering field, and any corresponding tables, to identify one or more link management procedures to perform. The UE and the base station may perform the one or more link management procedures according to the information in the WUS.

29 Claims, 17 Drawing Sheets

(51) Int. Cl.
*H04W 76/11* (2018.01)
*H04W 76/28* (2018.01)

(58) Field of Classification Search
USPC .......................................................... 370/311
See application file for complete search history.

(56) References Cited

U.S. PATENT DOCUMENTS

| | | | | |
|---|---|---|---|---|
| 2019/0059129 | A1* | 2/2019 | Luo | H04W 52/0216 |
| 2019/0149380 | A1* | 5/2019 | Babaei | H04L 5/001 |
| | | | | 370/330 |
| 2020/0029302 | A1* | 1/2020 | Cox | H04W 56/0015 |
| 2020/0037247 | A1* | 1/2020 | Liao | H04W 52/0219 |
| 2020/0107266 | A1* | 4/2020 | Liao | H04W 76/28 |
| 2020/0145921 | A1* | 5/2020 | Zhang | H04W 76/27 |
| 2020/0229095 | A1* | 7/2020 | Shrestha | H04W 52/0235 |
| 2021/0007053 | A1* | 1/2021 | Jiang | H04W 52/0293 |
| 2021/0234657 | A1* | 7/2021 | Miao | H04L 5/0051 |

OTHER PUBLICATIONS

International Search Report and Written Opinion—PCT/US2020/039268—ISA/EPO—dated Oct. 5, 2020 (193527WO).

Mediatek Inc: "Design of PDCCH-based PowerSaving Signal/Channel for NR", 3GPP Draft, R1-1906548 Design of PDCCH-based PowerSaving Signal/Channel for NR Final, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051727999, 16 pages, Retrieved from the Internet: URL: http://www.3gpp.org/ftp/Meetings%5F3GPP%5FSYNC/RAN1/Docs/R1%2D1906548%2Ezip. [retrieved on May 13, 2019] paragraph [2.2.1]—paragraph [02.3].

Qualcomm Incorporated: "PDCCH-based PowerSaving Channel Design," 3GPP Draft, 3GPP TSG-RAN WG1 #97, R1-1907294, PDCCH-based Power Saving Channel Design, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051728734, 16 pages, Retrieved from the Internet: URL: http://www.3gpp.org/ftp/Meetings%5F3GPP%5FSYNC/RAN1/Docs/R1%2D1907294%2Ezip [retrieved on May 13, 2019] paragraph [2.2.3.1]—paragraph [2.2.3.3].

Qualcomm Incorporated: "Potential Techniques for UE Power Saving", 3GPP Draft, 3GPP TSG-RAN WG1 #96, R1-1903016 Potential Techniques for UE Power Saving, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 16, 2019 (Feb. 16, 2019), XP051600713, 33 pages, Retrieved from the Internet: URL: http://www.3gpp.org/ftp/tsg%5Fran/WG1%5FRL1/TSGR1%5F96/Docs/R1%2D1903016%2Ezip [retrieved on Feb. 16, 2019] sections 2-4, paragraph[2. 2 .1]—paragraph [2. 2. 2] paragraph [2. 3.1.1]—paragraph [2. 3 .1.2] paragraph[3. 3 .1]—paragraph [3.3.3] paragraph [3. 4 .1]—paragraph [3. 4 .1].

Qualcomm Incorporated: "UE Adaptation to the Traffic and UE Power Consumption Characteristics", 3GPP Draft, 3GPP TSG-RAN WG1 Ad-Hoc Meeting 1901, R1-1900911 UE Adaptation for Power Saving, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593757, pp. 1-24 Retrieved from the Internet: URL: http://www.3gpp.org/ftp/Meetings%5F3GPP%5FSYNC/RAN1/Docs/R1%2D1900911%2Ezip, [retrieved on Jan. 20, 2019], Chapters 1.2.

* cited by examiner

WAKE-UP SIGNAL ASSISTED LINK MANAGEMENT

CROSS REFERENCE

The present application for patent claims the benefit of U.S. Provisional Patent Application No. 62/867,856 by NAM et al., entitled "WAKE-UP SIGNAL ASSISTED LINK MANAGEMENT," filed Jun. 27, 2019, assigned to the assignee hereof, and expressly incorporated by reference herein.

FIELD OF TECHNOLOGY

The following relates generally to wireless communications and more specifically to wake-up signal assisted link management.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless systems may perform link management procedures between two or more wireless devices, which may include measurements of downlink or uplink reference signals (RSs) and associated reporting. In some cases, discontinuous reception (DRX) inactive durations (e.g., low power durations) may create difficulties for performing link management procedures by introducing latency or by involving extra power being used by a UE.

SUMMARY

The described techniques relate to improved methods, systems, devices, and apparatuses that support wake-up signal assisted link management. Generally, the described techniques provide for a base station to trigger link management via a wake up message (e.g., wake-up signal (WUS)), such that a user equipment (UE) may maintain link performance and may reduce delays when switching to discontinuous reception (DRX) on-durations. The base station may transmit a WUS to the UE as part of DRX operations and may indicate, via the WUS, one or more link management procedures to perform. For example, the WUS may indicate one or more reference signals (RSs) that may be transmitted to the UE as part of the one or more link management procedures. In some examples, the base station may also use the WUS to indicate uplink transmission resources corresponding to feedback that may be based on the one or more RSs (e.g., resources may be configured for transmitting a report to the base station).

In some cases, the WUS may include fields corresponding to one or more UEs. A field may include at least one sub-field for triggering link management (e.g., a link management triggering field) and at least one sub-field indicating whether to wake-up during the on-duration. In some cases, the mere presence of a link management field may be sufficient to trigger wake-up during the on duration (without a specific wake-up field). Link management procedures may be indicated in a WUS using one or more configurations of a link management triggering field. In a first example, the link management triggering field may refer to an index in a table corresponding to aperiodic channel state information (CSI) RS (A-CSI-RS) resource sets of an active bandwidth part (BWP). In a second example, the link management triggering field may indicate an index in a table corresponding to a configuration of A-CSI-RS resource sets associated with WUSs. In a third example, one or more link management triggering fields may indicate a sequence of one or more indices in a table corresponding to the A-CSI-RS resource sets used with or configured for the WUSs and/or the A-CSI-RS of the active BWP. Accordingly, the UE may receive one or more of the link management triggering fields in the WUS and may use the one or more link management triggering fields, together with any corresponding tables, to identify one or more link management procedures to perform. The UE may perform the one or more link management procedures (e.g., receive RSs) and may transmit associated reports to the base station via an uplink message.

A method of wireless communication at a UE is described. The method may include monitoring, in a connected mode during DRX operation, a control channel during a WUS occasion associated with (e.g., occurring prior to or within) a DRX on-duration, detecting a wake-up message during the WUS occasion, the wake-up message being indicative of whether the UE is to wake-up to monitor the control channel during the DRX on-duration, identifying, from the wake-up message, a wake-up message component that triggers a link management procedure by the UE, and performing link management based on the wake-up message component.

An apparatus for wireless communication at a UE is described. The apparatus may include a processor, memory coupled with the processor, and instructions stored in the memory. The instructions may be executable by the processor to cause the apparatus to monitor, in a connected mode during DRX operation, a control channel during a WUS occasion associated with a DRX on-duration, detect a wake-up message during the WUS occasion, the wake-up message being indicative of whether the UE is to wake-up to monitor the control channel during the DRX on-duration, identify, from the wake-up message, a wake-up message component that triggers a link management procedure by the UE, and perform link management based on the wake-up message component.

Another apparatus for wireless communication at a UE is described. The apparatus may include means for monitoring, in a connected mode during DRX operation, a control channel during a WUS occasion associated with a DRX on-duration, detecting a wake-up message during the WUS occasion, the wake-up message being indicative of whether the UE is to wake-up to monitor the control channel during the DRX on-duration, identifying, from the wake-up message, a wake-up message component that triggers a link management procedure by the UE, and performing link management based on the wake-up message component.

A non-transitory computer-readable medium storing code for wireless communication at a UE is described. The code may include instructions executable by a processor to monitor, in a connected mode during DRX operation, a control channel during a WUS occasion associated with a DRX on-duration, detect a wake-up message during the WUS occasion, the wake-up message being indicative of whether the UE is to wake-up to monitor the control channel during the DRX on-duration, identify, from the wake-up message, a wake-up message component that triggers a link management procedure by the UE, and perform link management based on the wake-up message component.

Some examples of the method, apparatuses, and non-transitory computer-readable medium described herein may further include operations, features, means, or instructions for receiving, in advance of the WUS occasion, an indication of a size of the wake-up message component.

In some examples of the method, apparatuses, and non-transitory computer-readable medium described herein, the indication may be UE-specific and may be received via radio resource control (RRC) signaling or a medium access control (MAC) control element (CE) signaling.

In some examples of the method, apparatuses, and non-transitory computer-readable medium described herein, identifying the wake-up message component that triggers the link management procedure may include operations, features, means, or instructions for identifying, from the wake-up message component, a link management triggering state index.

Some examples of the method, apparatuses, and non-transitory computer-readable medium described herein may further include operations, features, means, or instructions for mapping the link management triggering state index to a corresponding CSI RS resource set included in an aperiodic CSI triggering state table or a corresponding sounding reference signal (SRS) resource set included in an aperiodic SRS triggering state table, where the aperiodic CSI triggering state table or the aperiodic SRS triggering state table uses a same mapping as a corresponding downlink control information (DCI) message to trigger link management.

In some examples of the method, apparatuses, and non-transitory computer-readable medium described herein, the link management triggering state index maps to a first subset of a total number of CSI RS resource sets included in the aperiodic CSI triggering state table, a first subset of a total number of SRS resource sets included in the aperiodic SRS triggering state table, or a combination thereof.

Some examples of the method, apparatuses, and non-transitory computer-readable medium described herein may further include operations, features, means, or instructions for receiving an indication of the first subset of the total number of CSI RS resource sets or of the total number of SRS resource sets via either RRC signaling or a MAC CE signaling in advance of the WUS occasion.

In some examples of the method, apparatuses, and non-transitory computer-readable medium described herein, the wake-up message component includes k bits for encoding the link management triggering state index, and where the first subset includes a first $2^k$ CSI triggering states of the aperiodic CSI triggering state table.

In some examples of the method, apparatuses, and non-transitory computer-readable medium described herein, the wake-up message component includes k bits for encoding the CSI triggering state index, and where the first subset includes a first $2^k$ CSI triggering state resource sets of the aperiodic CSI triggering state table that each satisfy a triggering offset beyond a triggering threshold when triggered.

Some examples of the method, apparatuses, and non-transitory computer-readable medium described herein may further include operations, features, means, or instructions for mapping the link management triggering state index to a corresponding CSI RS resource set included in a CSI triggering state table, where the CSI triggering state table may be different from a table to which a DCI message maps in order to trigger link management.

Some examples of the method, apparatuses, and non-transitory computer-readable medium described herein may further include operations, features, means, or instructions for mapping the link management triggering state index to a corresponding CSI RS resource set included in a CSI triggering state table, where the CSI triggering state table may be different from a table to which a DCI message maps in order to trigger link management, but includes one or more indices that reference a table to which the DCI message maps in order to trigger link management.

In some examples of the method, apparatuses, and non-transitory computer-readable medium described herein, the corresponding CSI RS resource set to which the link management triggering state index may be mapped includes a set of resource sets for differently-purposed CSI RSs.

In some examples of the method, apparatuses, and non-transitory computer-readable medium described herein, the link management trigger is common to a group of UEs.

In some examples of the method, apparatuses, and non-transitory computer-readable medium described herein, performing link management may include operations, features, means, or instructions for identifying uplink reporting resources for reporting link management measurements, and transmitting one or more link management reports including the link management measurements using the uplink reporting resources.

In some examples of the method, apparatuses, and non-transitory computer-readable medium described herein, the uplink reporting resources may be configured prior to the WUS occasion.

In some examples of the method, apparatuses, and non-transitory computer-readable medium described herein, the uplink reporting resources may be indicated via the wake-up message component.

A method of wireless communication at a base station is described. The method may include configuring a wake-up message for a UE operating according to DRX in a connected mode, the wake-up message being indicative of whether the UE is to wake-up to monitor a control channel during a DRX on-duration, and where the wake-up message includes a wake-up message component that triggers a link management procedure, transmitting the wake-up message during a WUS occasion associated with the DRX on-duration associated with the UE, and performing link management in accordance with the wake-up message component.

An apparatus for wireless communication at a base station is described. The apparatus may include a processor, memory coupled with the processor, and instructions stored in the memory. The instructions may be executable by the processor to cause the apparatus to configure a wake-up message for a UE operating according to DRX in a connected mode, the wake-up message being indicative of whether the UE is to wake-up to monitor a control channel during a DRX on-duration, and where the wake-up message includes a wake-up message component that triggers a link management procedure, transmit the wake-up message during a WUS occasion associated with the DRX on-duration associated with the UE, and perform link management in accordance with the wake-up message component.

Another apparatus for wireless communication at a base station is described. The apparatus may include means for configuring a wake-up message for a UE operating according to DRX in a connected mode, the wake-up message being indicative of whether the UE is to wake-up to monitor a control channel during a DRX on-duration, and where the wake-up message includes a wake-up message component that triggers a link management procedure, transmitting the wake-up message during a WUS occasion associated with the DRX on-duration associated with the UE, and performing link management in accordance with the wake-up message component.

A non-transitory computer-readable medium storing code for wireless communication at a base station is described. The code may include instructions executable by a processor to, configure a wake-up message for a UE operating according to DRX in a connected mode, the wake-up message being indicative of whether the UE is to wake-up to monitor a control channel during a DRX on-duration, and where the wake-up message includes a wake-up message component that triggers a link management procedure, transmit the wake-up message during a WUS occasion associated with the DRX on-duration associated with the UE, and perform link management in accordance with the wake-up message component.

Some examples of the method, apparatuses, and non-transitory computer-readable medium described herein may further include operations, features, means, or instructions for transmitting, in advance of the WUS occasion, an indication of a size of the wake-up message component.

In some examples of the method, apparatuses, and non-transitory computer-readable medium described herein, the indication may be UE-specific and may be received via RRC signaling or a MAC CE signaling.

In some examples of the method, apparatuses, and non-transitory computer-readable medium described herein, configuring the wake-up message may include operations, features, means, or instructions for including, in the wake-up message component, a link management triggering state index, where the link management triggering state index maps mapped to a corresponding CSI RS resource set included in an aperiodic CSI triggering state table or a corresponding SRS resource set included in an aperiodic SRS triggering state table are used by the UE for communicating with the base station.

In some examples of the method, apparatuses, and non-transitory computer-readable medium described herein, the aperiodic CSI triggering state table or the aperiodic SRS triggering state table may be a same table to which a DCI message maps in order to trigger link management.

In some examples of the method, apparatuses, and non-transitory computer-readable medium described herein, the link management triggering state index maps to one of a first subset of a total number of CSI RS resource sets included in the aperiodic CSI triggering state table, a first subset of a total number of SRS resource sets included in the aperiodic SRS triggering state table, or a combination thereof.

Some examples of the method, apparatuses, and non-transitory computer-readable medium described herein may further include operations, features, means, or instructions for transmitting an indication of the first subset of the total number of CSI RS resource sets or of the total number of SRS resource sets via either RRC signaling or a MAC CE signaling in advance of the WUS occasion.

In some examples of the method, apparatuses, and non-transitory computer-readable medium described herein, the wake-up message component includes k bits for encoding the CSI triggering state index, and where the first subset includes a first $2^k$ CSI triggering state resource sets of the CSI triggering state table.

In some examples of the method, apparatuses, and non-transitory computer-readable medium described herein, the wake-up message component includes k bits for encoding the link management triggering state index, and where the first subset includes a first $2^k$ CSI triggering states of the aperiodic CSI triggering state table that each satisfy a triggering offset beyond a triggering threshold when triggered.

In some examples of the method, apparatuses, and non-transitory computer-readable medium described herein, the aperiodic CSI triggering state table may be different from a table to which a DCI message maps in order to trigger link management.

In some examples of the method, apparatuses, and non-transitory computer-readable medium described herein, the aperiodic CSI triggering state table may be different from a table to which a DCI message maps in order to trigger link management, but includes one or more indices that reference a table to which a DCI message maps in order to trigger link management.

In some examples of the method, apparatuses, and non-transitory computer-readable medium described herein, the corresponding CSI RS resource set to which the link management triggering state index may be mapped includes a set of resource sets for differently-purposed CSI RSs.

In some examples of the method, apparatuses, and non-transitory computer-readable medium described herein, configuring the wake-up message may include operations, features, means, or instructions for configuring the wake-up message component to apply to a group of UEs operating according to DRX in the connected mode, the group of UEs including the identified UE.

In some examples of the method, apparatuses, and non-transitory computer-readable medium described herein, performing link management may include operations, features, means, or instructions for receiving one or more link management reports using uplink reporting resources configured by the base station prior to the WUS occasion.

In some examples of the method, apparatuses, and non-transitory computer-readable medium described herein, performing link management may include operations, features, means, or instructions for receiving one or more link management reports using uplink reporting resources indicated via the wake-up message component.

DETAILED DESCRIPTION

Figure 1:
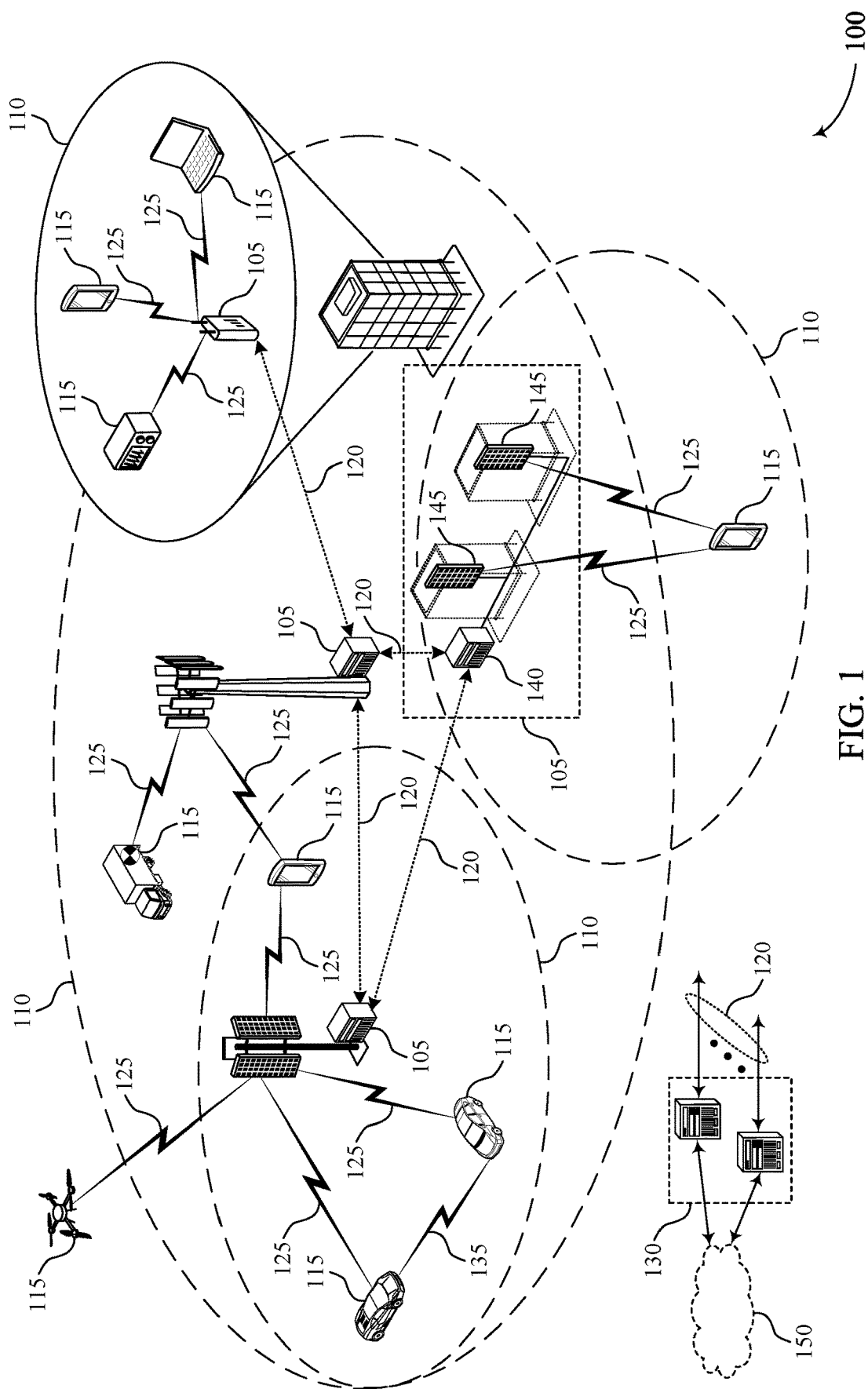
FIG. 1 illustrates an example of a wireless communications system that supports wake-up signal (WUS) assisted fast link management in accordance with aspects of the present disclosure.

A base station may transmit a wake-up signal (WUS) to a user equipment (UE) when the UE is operating in a discontinuous reception (DRX) mode (e.g., connected DRX (C-DRX) mode). A WUS may reduce a chance of the UE waking up (e.g., powering on) when there may be no scheduled transmissions from the base station to the UE during an associated on-duration. In some cases, a WUS occasion may be configured a predefined amount of time prior to an on-duration (e.g., separated by an offset) of each DRX cycle, and a WUS transmitted in the WUS occasion may indicate whether the UE is to wake-up for the on-duration or to stay in a low power mode (e.g., stay asleep). In some cases, a WUS may also be configured to trigger a link management procedure, where the link management procedure may be performed during the on-duration or during another time period.

A link management procedure may include link quality measurements of downlink reference signals (RSs) followed by uplink reporting (e.g., channel state information (CSI) reporting) by the UE, uplink RS transmissions by the UE, and/or link adaptation and updates by the base station. In some cases, DRX inactive durations (e.g., low power durations) may create difficulties for performing link management procedures. For example, in order to perform link management during DRX inactive durations, a UE may wake-up frequently in order to perform measurements, which may use power. Further, in some cases, reporting measurements (e.g., measured CSI and beam qualities, etc.) and receiving a corresponding indication from a base station may be restricted to DRX on-durations, which may introduce latency when performing link management procedures.

Accordingly, link qualities (e.g., beam-paired link and channel conditions) may degrade during some DRX inactive durations. As such, a base station may trigger link management via a WUS, such that a UE may maintain link performance and may reduce delays when switching to DRX on-durations. The base station may transmit a WUS to the UE as part of DRX operations (e.g., C-DRX operations) and may indicate, via the WUS, one or more link management procedures to perform. For example, the WUS may indicate one or more RSs that may be transmitted to the UE as part of the one or more link management procedures. In some examples, the WUS may indicate for the UE to remain asleep during the on-duration and may indicate one or more link management procedures to perform. In some cases, the one or more link management procedures (e.g., including transmission of the one or more RSs) may take place during the on-duration or during a different time period (e.g., as indicated in the WUS).

In some examples, the base station may also use the WUS to indicate uplink transmission resources corresponding to feedback that may be based on the one or more RSs (e.g., resources may be configured for transmitting a report to the base station). In some cases, the WUS may include a dynamic uplink resource assignment or uplink resources may be configured for the UE (e.g., may be previously configured), and may include a physical uplink control channel (PUCCH), a grant-free physical uplink shared channel (PUSCH), or the like.

In some cases, the WUS may include fields corresponding to one or more UEs. A field may include at least one sub-field for triggering link management (e.g., a link management triggering field) and at least one sub-field indicating whether to wake-up during the on-duration. A link management triggering field may have a size corresponding to a number of bits (e.g., k bits), where the number of bits may be specific to a UE or to multiple UEs (e.g., a system) and may be configured via higher-layer signaling (e.g., radio resource control (RRC) signaling, medium access control (MAC) control element (CE) signaling, etc.).

Link management procedures may be indicated in a WUS using one or more configurations of a link management triggering field. In a first example, the link management triggering field may refer to an index in a table corresponding to aperiodic CSI RS (A-CSI-RS) resource sets of an active bandwidth part (BWP). In a second example, the link management triggering field may indicate an index in a table corresponding to a configuration of A-CSI-RS resource sets configured for use with WUSs. In a third example, one or more link management triggering fields may indicate a sequence of one or more indices in a table corresponding to the A-CSI-RS resource sets of the WUSs and/or the A-CSI-RS resource sets of the active BWP. Accordingly, the UE may receive one or more of the link management triggering fields in the WUS and may use the one or more link management triggering fields, together with any corresponding tables, to identify one or more link management procedures to perform. The UE may perform the one or more link management procedures (e.g., the UE may receive RSs) and may transmit associated reports to the base station via an uplink message.

Aspects of the disclosure are initially described in the context of wireless communications systems. Aspects of the disclosure are further illustrated by and described with reference to a resource scheme, WUS configurations, table configurations, apparatus diagrams, system diagrams, and flowcharts that relate to wake-up signal assisted link management.

FIG. 1 illustrates an example of a wireless communications system 100 that supports wake-up signal assisted link management in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some wireless systems, link qualities (e.g., beam-paired link and channel conditions) may degrade during DRX inactive durations. As such, a base station 105 may trigger link management via a WUS, such that a UE 115 may maintain link performance and may reduce delays when switching to DRX on-durations. The base station 105 may transmit a WUS to the UE 115 as part of DRX operations (e.g., C-DRX operations) and may indicate, via the WUS, one or more link management procedures to perform. For example, the WUS may indicate one or more RSs that may be transmitted to the UE 115 as part of the one or more link management procedures. In some cases, the one or more link management procedures (e.g., including transmission of the one or more RSs) may occur during the on-duration or during a different time period (e.g., as indicated in the WUS).

In some cases, the WUS may include fields corresponding to one or more UEs 115. A field may include at least one sub-field for triggering link management (e.g., a link management triggering field) and at least one sub-field indicating whether to wake-up during the on-duration. Link management procedures may be indicated in a WUS using one or more configurations of a link management triggering field. In a first example, the link management triggering field may refer to an index in a table corresponding to A-CSI-RS resource sets of an active BWP. In a second example, the link management triggering field may indicate an index in a table corresponding to a configuration of A-CSI-RS resource sets associated with WUSs. In a third example, one or more link management triggering fields may indicate a sequence of one or more indices in a table corresponding to the A-CSI-RS resource sets of the WUSs and/or the A-CSI-RS resource sets of the active BWP. Accordingly, the UE 115 may receive one or more of the link management triggering fields in the WUS and may use the one or more link management triggering fields, together with any corresponding tables, to identify one or more link management procedures to perform. The UE 115 may perform the one or more link management procedures (e.g., receive RSs) and may transmit associated reports to the base station 105 via an uplink message.

Figure 2A:
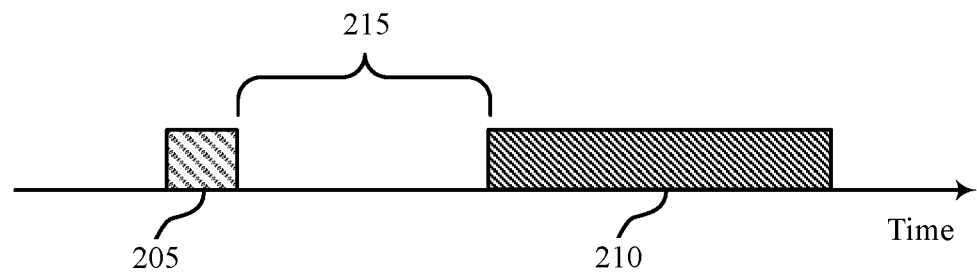
FIGS. 2A and 2B illustrate an example of a resource scheme and a wireless communications system that support WUS assisted link management in accordance with aspects of the present disclosure.

FIG. 2A illustrates an example of a resource scheme 201 that supports WUS assisted link management in accordance with aspects of the present disclosure. In some examples, resource scheme 201 may implement aspects of wireless communications system 100 and may be used by a UE 115 and a base station 105, which may be examples of a UE 115 and a base station 105 described with reference to FIG. 1. In some cases, the base station 105 may use resource scheme 201 to transmit a WUS to the UE 115 when the UE 115 is operating in a C-DRX reception mode, where the WUS may include information triggering a link management procedure.

Resource scheme 201 may include a WUS occasion 205, where WUS occasion 205 may include time and frequency resources for transmitting a WUS. In some cases, the base station 105 may transmit a WUS to the UE 115 using resources corresponding to the WUS occasion 205. The UE 115 may determine whether to monitor downlink resources (e.g., a PDCCH) during an on-duration 210 based on receiving the WUS in the WUS occasion 205 or based on information included in the WUS. In some cases, the base station 105 may refrain from transmitting a WUS to the UE 115 in the WUS occasion 205, and the UE 115 may determine to not monitor downlink resources (e.g., remain in a power saving or sleep mode) during the associated on-duration 210 based on not receiving the WUS in the WUS occasion 205. The on-duration 210 may be associated with the WUS occasion 205 and may include a predefined time period for monitoring downlink resources for communications from the base station 105. On-duration 210 may be separated from the WUS occasion 205 by an offset 215 in a time dimension.

The WUS may be a PDCCH-based message that may be configured for the UE 115 or for a group of UEs 115 (e.g., including the UE 115). The base station 105 and the UE 115 may employ a WUS to improve power usage during C-DRX operations. For example, a WUS may reduce a chance of the UE 115 waking up (e.g., powering on) when there may be no scheduled transmissions from the base station 105 to the UE 115 during the on-duration 210. In some cases, a WUS occasion 205 may be configured to be associated with one or more DRX cycles. In some cases, a WUS occasion 205 may be configured a predefined amount of time prior to an on-duration 210 (e.g., separated by an offset 215) of each DRX cycle. In some cases, as described with reference to FIG. 2B, a WUS may also be configured to trigger a link management procedure, where the link management procedure may be performed during the on-duration 210 or during another time period.

Figure 2B:
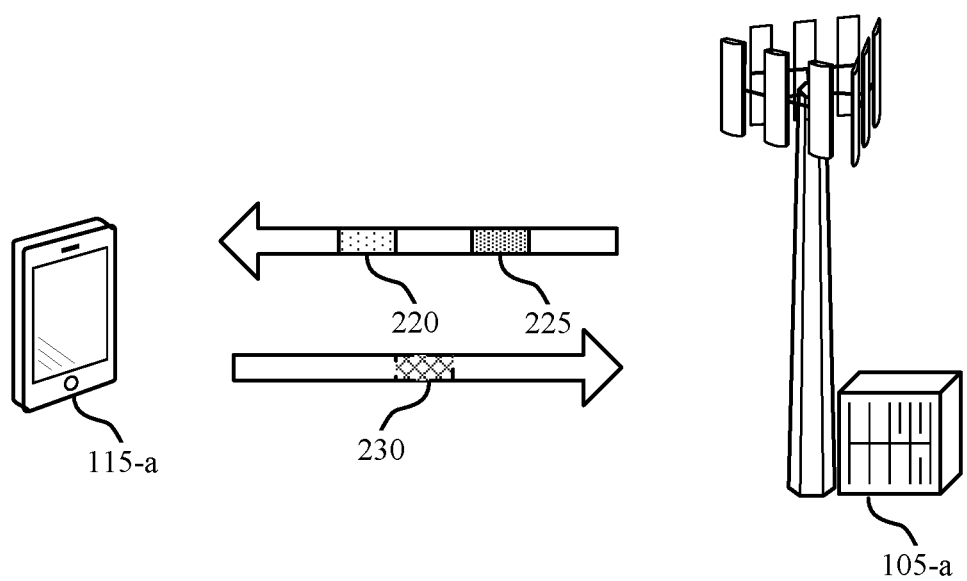

FIG. 2B illustrates an example of a wireless communications system 202 that supports WUS assisted link management in accordance with aspects of the present disclosure. In some examples, wireless communications 202 may implement aspects of wireless communications system 100 and/or resource scheme 201. Wireless communications system 202 may include a UE 115-*a* and a base station 105-*a*, which may be examples of a UE 115 and a base station 105 as described with reference to FIGS. 1 and 2A. In some cases, base station 105-*a* may transmit a WUS 220 to UE 115-*a* when UE 115-*a* is operating in a C-DRX mode, where the WUS 220 may include information triggering a link management procedure.

A link management procedure may include link quality measurements of downlink RS followed by uplink reporting (e.g., CSI reporting) by UE 115-*a*, uplink RS transmissions by UE 115-*a*, and/or link adaptation and updates by base station 105-*a*. For example, a link management procedure may include CSI acquisition, transmit or receive beam management procedures, link recovery processes, frequency and/or time tracking, or the like. In some cases, DRX off-durations (e.g., inactive durations) may create difficulties for performing link management procedures. For example, available measurement resources, such as CSI RS and synchronization signal or physical broadcast channel (PBCH) blocks, may be widely spread out (e.g., may be sparse) during DRX off-durations. In some cases, in order to perform link management during DRX off-durations, a UE 115-*a* may wake-up frequently (e.g., due to resource distributions) in order to perform measurements, which may be disadvantageous for power saving. Further, in some cases, reporting measurements (e.g., measured CSI and beam qualities) and receiving a corresponding indication from a base station 105-*a* may be restricted to DRX on-durations, which may introduce latency when performing link management procedures. In some wireless systems (e.g., NR networks), link management procedures may maintain communications qualities via processes such as beam management, which may require more frequent link management procedures as compared to other processes.

Accordingly, link qualities (e.g., beam-paired link and channel conditions) may degrade during some DRX off-durations. In some cases, UE 115-*a* may receive a WUS 220 indicating for UE 115-*a* to begin an on-duration (e.g., active time operation) and communications performance, such as downlink or uplink throughput and/or error rate, may be impacted by one or more degraded link qualities. Link management processes (e.g., procedures) may be performed after UE 115-*a* begins the active time operation (e.g., on-duration), but may cause additional delays and may use additional signaling resources. As such, base station 105-*a* may trigger link management via a WUS 220, such that UE 115-*a* may maintain link performance during C-DRX operation and may reduce delays when switching to DRX on-durations. In some examples, when triggering link management using WUS 220, base station 105-*a* may transmit less DCI during active time for link management purposes, thus reducing communications latency and improving communications performance.

Base station 105-*a* may transmit WUS 220 to UE 115-*a* as part of C-DRX operations, as described with reference to FIG. 2A. For example, base station 105-*a* may transmit WUS 220 to UE 115-*a* a set amount of time before an on-duration, in order to indicate for UE 115-*a* to activate during the on-duration or remain asleep during the on-duration. Base station 105-*a* may further use the WUS 220 to indicate one or more link management processes to perform. For example, WUS 220 may indicate one or more RSs 225 that may be transmitted to UE 115-*a* as part of the one or more link management processes. In some examples, the WUS 220 may indicate for UE 115-*a* to remain asleep during the on-duration and may indicate one or more link management processes to perform. In some cases, the one or more link management processes (e.g., including transmission of the one or more RSs 225) may take place during the on-duration (e.g., as indicated in the WUS 220), while in other cases, the one or more link management processes may take place during a different time period (e.g., as indicated in the WUS 220).

In some examples, base station 105-*a* may also use the WUS 220 to indicate uplink transmission resources corresponding to feedback that may be based on the one or more RSs 225 (e.g., resources may be configured for transmitting a report to base station 105-*a* based on the one or more RSs 225). UE 115-*a* may receive the one or more RSs 225 (e.g., CSI RS, beam management signals, etc.) and may transmit an uplink message 230 (e.g., beam management message, CSI report, etc.) to base station 105-*a* using the indicated uplink resources and based on the one or more RSs 225 (e.g., based on measurements of the one or more RSs 225).

In some cases, the WUS 220 may include fields corresponding to one or more UEs 115. For example, WUS 220 may include a field corresponding to UE 115-*a* and a field corresponding to another UE 115. In some cases, one field may correspond to multiple UEs 115 (e.g., UE 115-*a* and one or more other UEs 115). A field may include at least one sub-field for triggering link management (e.g., a link management triggering field) and at least one sub-field indicating whether to wake-up during the on-duration. A link management triggering field may have a size corresponding to a number of bits (e.g., k bits), where the number of bits may be specific to a UE 115 or to multiple UEs 115 (e.g., a system) and may be configured via higher-layer signaling (e.g., RRC signaling, MAC CE, etc.). In one example, WUS 220 may contain one or more fields, where a first field (e.g., corresponding to UE 115-*a*) may be configured with a first link management triggering field size and a second field (e.g., corresponding to a differ UE 115) may be configured with a second link management triggering field size.

In cases where an indicated link management procedure includes transmitting uplink message 230 from UE 115-*a* to base station 105-*a* (e.g., for CSI or other uplink reporting), the associated WUS 220 may include a dynamic resource assignment for uplink message 230. Additionally or alternatively, uplink resources for uplink message 230 may be configured for UE 115-*a* (e.g., may be previously configured), and may include a PUCCH, a grant-free PUSCH, or the like.

Link management procedures may be indicated in a WUS 220 using one or more configurations of a link management triggering field. In a first example, the link management triggering field may indicate an index in a table corresponding to A-CSI-RS resource sets of an active BWP, where the table may indicate resources, quasi co location (QCL) information, and other information related to the indicated link management procedure. Based on a size of the link management triggering field (e.g., k bits), the link management triggering field may indicate any (e.g., all) of the indices of the A-CSI-RS table or a subset of the indices of the A-CSI-RS table. In a second example, the link management triggering field may indicate an index in a table corresponding to a separate configuration of A-CSI-RS resource sets associated with WUSs 220. The table may include a same framework and same parameters as the A-CSI-RS resource sets for the active BWP, such that the table may indicate resources, QCL information, and other information related to the indicated link management procedure. In a third example, one or more link management triggering fields may indicate a sequence of one or more indices in a table corresponding to the separate configuration of A-CSI-RS resource sets and/or the A-CSI-RS resource sets of the active BWP. For example, A-CSI-RS resources for different purposes (e.g., CSI acquisition, frequency and/or time tracking, transmission or reception beam management, etc.) may be triggered simultaneously or in a sequence by a single link management triggering field or multiple link management triggering fields. In some cases, a link management triggering field may indicate an index in a link management combination table, where the link management combination table may indicate one or more combinations of indices corresponding to one or both of the tables for the A-CSI-RS resource sets of the WUSs 220 and the A-CSI-RS resource sets of the active BWP.

UE 115-a may be configured with the one or more of the above-described tables via higher layer signaling (e.g., RRC signaling, MAC CEs, etc.). Accordingly, UE 115-a may receive one or more of the link management triggering fields in WUS 220 and may use the one or more link management triggering fields, together with any corresponding tables, to identify one or more link management procedures to perform. Accordingly, UE 115-a may perform the one or more link management procedures (e.g., receive RSs 225) and may transmit associated reports to base station 105-a via uplink message 230.

Figure 3A:
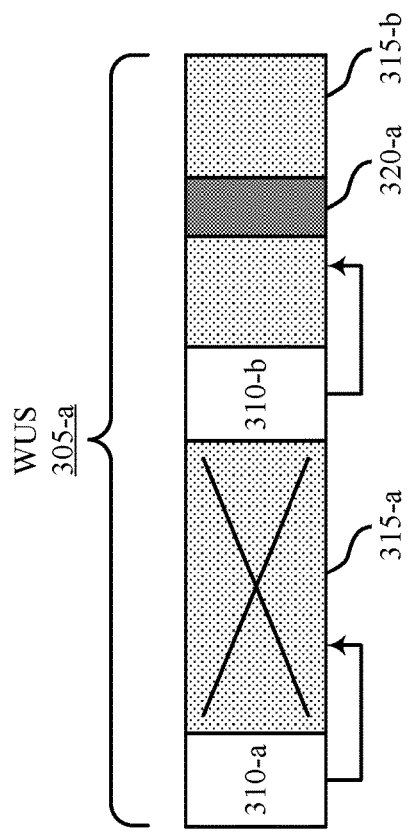
FIGS. 3A and 3B illustrate examples of WUS configurations that support WUS assisted link management in accordance with aspects of the present disclosure.
Figure 3B:
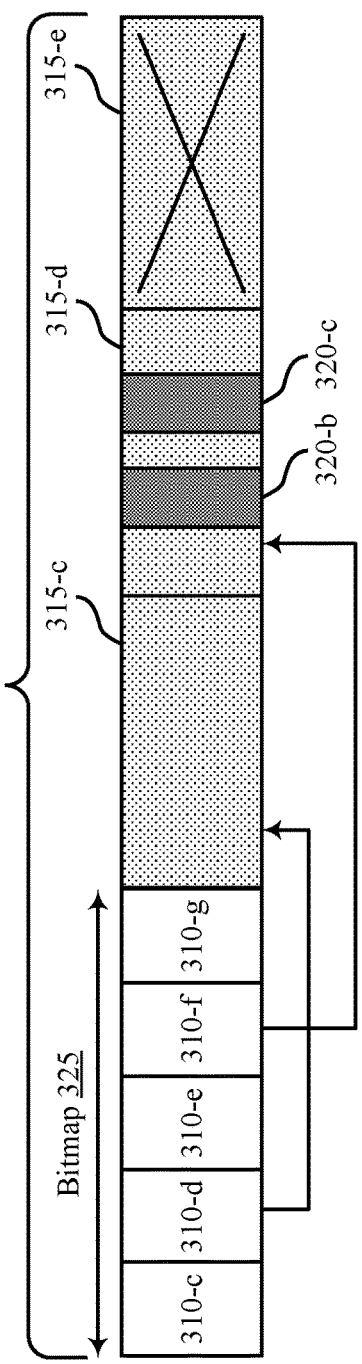

FIGS. 3A and 3B illustrate examples of WUS configurations 301 and 302 that support WUS assisted link management in accordance with aspects of the present disclosure. In some examples, WUS configurations 301 and 302 may implement aspects of wireless communications systems 100 or 202. For example WUS configuration 301 and/or 302 may be used to transmit one or more WUSs 305 from a base station 105 to a UE 115, which may be examples of a UE 115 and a base station 105 described with reference to FIGS. 1-2B. In some cases, WUS configuration 301 and/or 302 may include a configuration of a link management triggering field 320 within a WUS 305, such that the WUS 305 may be used to trigger one or more link management procedures at the UE 115.

As described above with reference to FIGS. 2A and 2B, a WUS 305 may be configured (e.g., by a base station 105) for a single UE 115 or a group of UEs 115. For example, a base station 105 may address the WUS 305 to one or more UEs 115 using a radio network temporary identifier (RNTI) (e.g., a power saving RNTI tied to C-DRX operations) associated with the one or more UEs 115. If a WUS 305 is configured for a group of UEs 115, the group of UEs 115 may be broken into sub-groups of UEs 115, including one or more UEs 115. For example, a sub-group may include one UE 115 or any number of UEs 115 up to a number of UEs 115 in the group. Each sub-group of UEs 115 (e.g., one UE 115) may be associated with a wake-up indication field 310 of the WUS 305, where the wake-up indication field 310 may indicate whether the sub-group of UEs 115 is to wake-up for an associated on-duration (e.g., a next on-duration). For example, if a value of the wake-up indication field 310 is set to "1," the WUS 305 may indicate for the sub-group of UEs 115 (e.g., one UE 115) to wake-up for the next on-duration. If the wake-up indication field 310 is not set to "1" (e.g., is set to "0"), the sub-group of UEs 115 (e.g., one UE 115) may skip the next on-duration (e.g., may stay asleep during the next on-duration).

In a first example, WUS 305-a may include two wake-up indication fields 310-a and 310-b. Wake-up indication field 310-a may be set to a value of "0" (e.g., not set to "1"), which may indicate that a sub-group of UEs 115 (e.g., one UE 115) corresponding to wake-up indication field 310-a is to skip an associated on-duration (e.g., a next on-duration). Wake-up indication field 310-b may be set to a value of "1," indicating for an associated sub-group of UEs 115 to wake-up (e.g., enter an active period) during an associated on-duration (e.g., a next on-duration). In a second example, WUS 305-b may include a bitmap 325 including wake-up indication fields 310-c through 310-g. Wake-up indication fields 310-d and 310-f may be set to a value of "1," while the other wake-up indication fields 310 may each be set to a value of "0." As such, of the bitmap 325 may indicate for sub-groups of UEs 115 associated with wake-up indication fields 310-d and 310-f to wake-up during an associated on-duration, and may also indicate for sub-groups of UEs 115 associated with the remaining wake-up indication fields 310 to skip the associated on-duration.

A wake-up indication field 310 of a WUS 305 may be associated with a field 315 of the WUS 305, where the field 315 may be associated with a same sub-group of UEs 115 (e.g., one UE 115) as the wake-up indication field 310. A wake-up indication field 310 may be associated with a field 315 via a fixed mapping or via a dynamic mapping. For example, WUS 305-a may include a fixed mapping of wake-up indication field 310-a to field 315-a and wake-up indication field 310-b to field 315-b. In some cases, field 315-a may be empty or not contain any information (e.g., for the corresponding sub-group) based on wake-up indication field 310-a including a value of "0." In another example, WUS 305-b may include a dynamic mapping (e.g., based on bitmap 325) between wake-up indication fields 310 and associated fields 315. In this example, wake-up indication field 310-d may be a first wake-up indication field 310 in the bitmap 325 with a value of "1," and therefore may be associated with a first field 315-c. Wake-up indication field 310-f may be a second wake-up indication field 310 in the bitmap 325 with a value of "1," and therefore may be associated with a second field 315-d. If no other wake-up indication fields 310 include a "1," a third field 315-e may be ignored. In some cases, field 315-e may therefore be empty or not contain any information. A field 315 may include one or more link management trigger fields 320, where a link management trigger field 320 may include an indication for an associated sub-group of UEs 115 to perform one or more link management procedures.

In some cases, the link management trigger field 320 may indicate the one or more link management procedures by including an index corresponding to a table containing link management procedure information, as described with reference to FIG. 2B. Tables associated with link management procedures are described in further detail with reference to FIGS. 4A, 4B, and 4C. Some fields 315 may include a link management trigger field 320, while some fields may not. In the example of WUS 305-b, field 315-c may not include a link management trigger field 320, while field 315-d may include at least one link management trigger field 320. In some cases, a field 315 may include more than one link management trigger field 320, such as field 315-d (e.g., including link management trigger fields 320-b and 320-c). In some examples, including more than one link management trigger field 320 may indicate for a corresponding sub-group of UEs 115 (e.g., one UE 115) to perform more than one link management procedure. In some examples, a single link management trigger field 320 may indicate for a corresponding sub-group of UEs 115 (e.g., one UE 115) to perform more than one link management procedure. In some cases, a field 315 may include a link management trigger field 320 even if an associated wake-up indication field 310 includes a "0" (e.g., indicates to skip an associated on-duration).

A sub-group of UEs 115 or a single UE 115 may receive a WUS 305 and may identify a wake-up indication field 310 corresponding to the sub-group of UEs 115 or single UE 115. The wake-up indication field 310 may be associated with a field 315 of the WUS 305 (e.g., associated via a fixed or dynamic mapping), and the sub-group of UEs 115 or single UE 115 may identify a field 315 associated with the wake-up indication field 310. In some cases, the field 315 may include one or more link management trigger fields 320, which may indicate for the sub-group of UEs 115 or UE 115 to perform one or more link management procedures, as described herein.

Figure 4A:
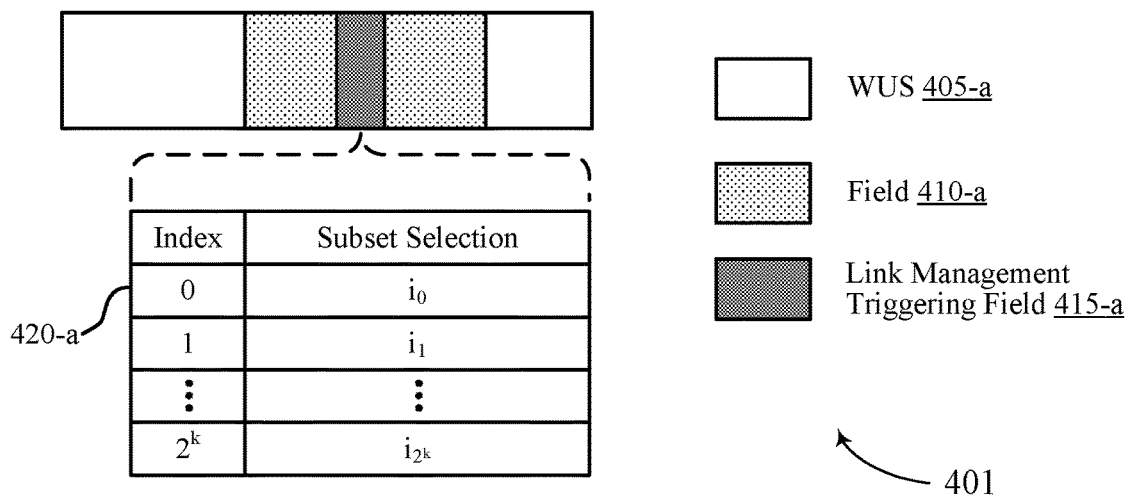
FIGS. 4A, 4B, and 4C illustrate examples of table configurations that support WUS assisted link management in accordance with aspects of the present disclosure.
Figure 4B:
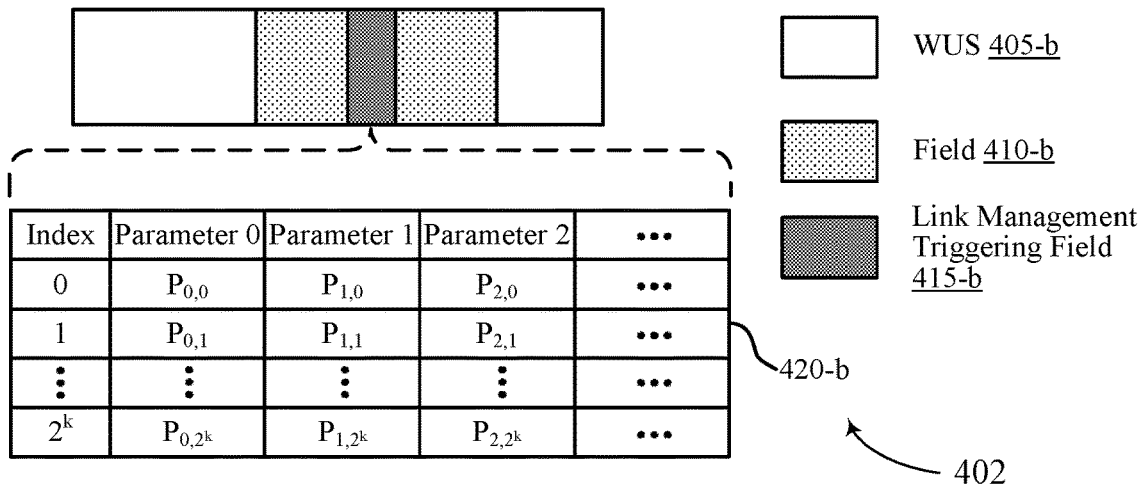
Figure 4C:
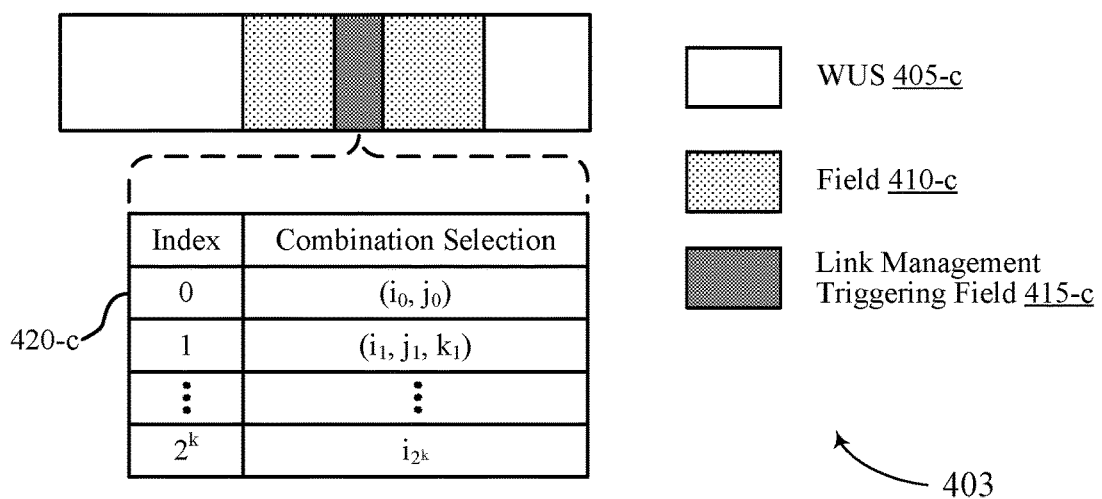

FIGS. 4A, 4B, and 4C illustrate examples of table configurations 401, 402, and 403 that support WUS assisted link management in accordance with aspects of the present disclosure. In some examples, table configurations 401, 402, and 403 may implement aspects of wireless communications systems 100 or 202, as well as WUS configurations 301 and/or 302. For example table configurations 401, 402, and/or 403 may referenced in one or more WUSs 405 transmitted from a base station 105 to a UE 115, which may be examples of a UE 115 and a base station 105 described with reference to FIGS. 1-3B. In some cases, table configurations 401, 402, and/or 403 may include a configuration of a link management procedure which a WUS 405 may reference (e.g., via an index), such that the WUS 405 may trigger one or more link management procedures at the UE 115.

As described with reference to FIGS. 3A and 3B, a WUS 405 may include one or more fields 410, where each field may be associated with one or more UEs 115 (e.g., a group of UEs 115). A field 410 may include one or more link management triggering fields 415, which may be associated with a same group of UEs 115 as the field 410. The one or more link management triggering fields 415 may indicate one or more link management procedures for the group of UEs 115 (e.g., one UE 115) to perform. For example, a link management triggering field may reference an index in a table 420, where the table may include references to, or parameters associated with, a number of link management procedures. A table 420 may be configured at a UE 115 via higher layer signaling (e.g., RRC signaling, MAC CE signaling) from a base station 105.

In some examples, a table 420 size (e.g., number of link management procedures) may be based on a size of an associated link management triggering field 415 (e.g., a bit size). In some cases, a table 420 may be associated with a link management triggering field 415, a field 410, and/or a WUS 405 via higher layer signaling (e.g., RRC signaling, MAC CE signaling) from a base station 105 or via an indication in the WUS 405, the field 410, or the link management triggering field 415. For example, if a size of a link management triggering field 415 is k bits, an associated table 420 may include references to, or parameters associated with, up to $2^k$ link management procedures (e.g., based on a number of indices able to be referenced by the k bits). A link management triggering field 415 may include a number (e.g., represented by the bits) that may represent an index in an associated table 420, such that a UE 115 may reference the table 420 using the number and look up an indicated link management procedure.

In a first example, a link management triggering field 415-a may be associated with an index in a table 420-a that may be further associated with a second, previously-configured table at the UE 115, such as a configuration of aperiodic CSI triggering states (e.g., A-CSI-RS resource set configuration) or SRS triggering states for an active BWP. As such, a UE 115 may receive a link management triggering field 415-a, which may indicate an index in table 420-a (e.g., via bits in link management triggering field 415-a). The UE 115 may look up the indicated index in table 420-a, and table 420-a may indicate a second index in the second table (e.g., aperiodic CSI triggering state table). The UE 115 may therefore look up the second index in the second table, and the second index in the second table may specify one or more parameters (e.g., channel resources, interference resources, QCL information, other link management information, etc.) associated with a link management procedure for the UE 115 to perform. Accordingly, the UE 115 may perform the link management procedure according to the specified parameters.

In some cases, a table of aperiodic CSI triggering states may include more states than indices in table 420-a (e.g., more than $2^k$ states). For example, the table of aperiodic CSI triggering states may include 64 states and k may be less than six, such that $2^k$ may be less than 64. As such, the indices of table 420-a may be associated with a subset of the table of aperiodic CSI triggering states (e.g., a $2^k$ subset). In one example, a base station 105 may explicitly select a subset of the aperiodic CSI triggering states and may include the subset in table 420-a or may indicate the subset to the UE 115 via higher layer signaling (e.g., RRC signaling, MAC CE signaling). In another example, a subset may be implicitly selected based on one or more criteria. A criterion may include selecting a first $2^k$ number of triggering states or selecting a first $2^k$ number of triggering states for which a triggering offset (e.g., a time between a triggering event and an RS transmission) is larger than a defined threshold (e.g., an offset between the WUS 405-a and an on-duration). While described with reference to a table of CSI triggering states, the same principles may also apply to a table of SRS triggering states.

In a second example, a link management triggering field 415-b may be associated with an index in a table 420-b including one or more link management procedure parameters (e.g., A-CSI-RS resource sets). In some cases, the link management procedure parameters may include channel resources, interference resources, QCL information, other link management information, or the like. Any number of parameters may be included in table 420-b. In some cases, the parameters may be a same set of parameters as indicated in a configuration of aperiodic CSI triggering states (e.g., A-CSI-RS resource set configuration) for an active BWP. A UE 115 may receive a link management triggering field 415-b, which may indicate an index in table 420-b (e.g., via bits in link management triggering field 415-b). The UE 115 may look up the indicated index in table 420-b, and the index may specify one or more parameters included in table 420-b for a link management procedure for the UE 115 to perform. For example, parameters $P_{0,1}$, $P_{1,1}$, $P_{2,1}$, and so forth may each represent one of the above-described parameters that may be associated with index 1 in table 420-b. The UE 115 may perform the link management procedure according to the specified parameters.

In a third example, a link management triggering field 415-c may be associated with a table 420-c that may be configured to trigger a sequence of one or more link management procedures (e.g., trigger one or more triggering states). The sequence of link management procedures may be triggered simultaneously or in a sequence using one or more link management triggering fields 415-c of WUS 405-c. In one example, an index in table 420-c may indicate one or more other indices corresponding to different link management procedures (e.g., A-CSI-RS resources with different purposes) referenced in one or more other tables previously configured at a UE 115 (e.g., table 420-b, a table of aperiodic CSI triggering states, a table of SRS triggering states, etc.). For example, an index 0 in table 420-c may indicate two indices corresponding to table 420-b, two indices corresponding to a CSI triggering state table, or one index corresponding to each. As such, the UE 115 may look up the indicated indices in the corresponding table(s) and may perform the one or more link management procedures indicated by the parameters in the corresponding table(s). As described above, the link management procedures may be performed in a sequence or simultaneously (e.g., as indicated in table 420-c or WUS 405-c).

Figure 5:
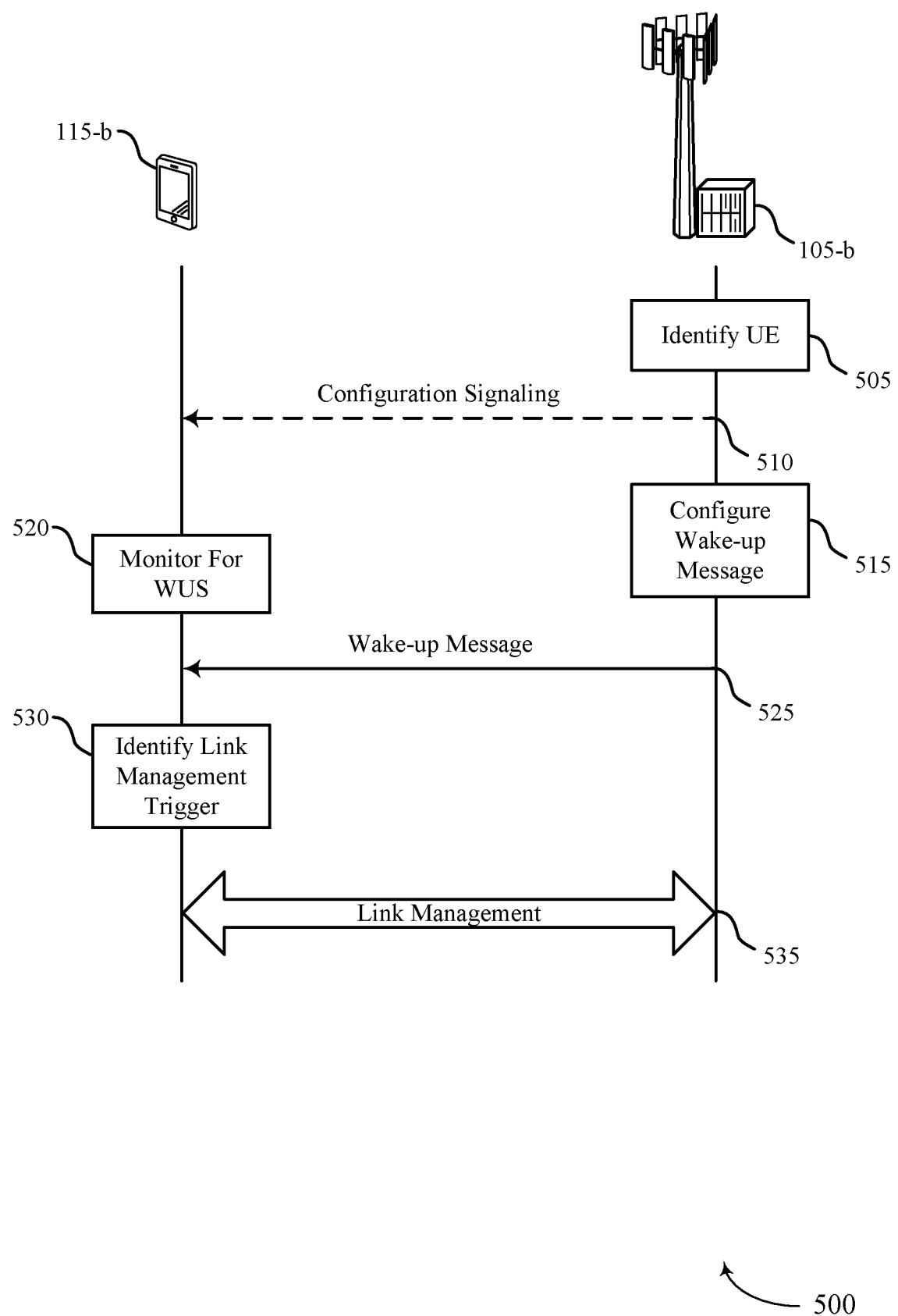
FIG. 5 illustrates an example of a process flow that supports WUS assisted link management in accordance with aspects of the present disclosure.

FIG. 5 illustrates an example of a process flow 500 that supports WUS assisted link management in accordance with aspects of the present disclosure. In some examples, process flow 500 may implement aspects of wireless communications systems 100 or 202. Process flow 500 may also implement aspects of resource scheme 201, WUS configurations 301 and/or 302, and table configurations 401, 402, and/or 403. Process flow may be implemented by a base station 105-b and a UE 115-b, which may be examples of a base station 105 and a UE 115 described with reference to FIGS. 1-4C. In some cases, base station 105-b may transmit a WUS to UE 115-b (e.g., when UE 115-b is operating in a C-DRX mode), where the WUS may include information triggering a link management procedure.

In the following description of the process flow 500, the operations between UE 115-b and base station 105-b may be transmitted in a different order than the order shown, or the operations performed by base station 105-b and UE 115-b may be performed in different orders or at different times. Certain operations may also be left out of the process flow 500, or other operations may be added to the process flow 500. It is to be understood that while base station 105-b and UE 115-b are shown performing a number of the operations of process flow 500, any wireless device may perform the operations shown.

At 505, base station 105-b may identify a UE (e.g., UE 115-b) operating according to DRX in a connected mode.

At 510, base station 105-b may transmit, to UE 115-b, configuration signaling related to one or more WUS procedures. In some cases, base station 150-b may transmit, to UE 115-b and in advance of the WUS occasion, an indication of a size of a wake-up message component. In some cases, the indication of the size of the wake-up message component may be UE-specific and may be received via RRC signaling or a MAC CE signaling.

At 515, base station 105-b may configure a wake-up message (e.g., a WUS) for UE 115-b, the wake-up message being indicative of whether UE 115-b is to wake-up to monitor a control channel (e.g., PDCCH) during a DRX on-duration, and where the wake-up message may include a wake-up message component that triggers a link management procedure. In some cases, base station 105-b may configure the wake-up message component to apply to a group of UEs 115 operating according to discontinuous reception in the connected mode, the group of UEs 115 including the identified UE 115-b.

In some cases, base station 105-b may include, in the wake-up message component, a link management triggering state index, where the link management triggering state index may be mapped to a corresponding CSI RS resource set included in an aperiodic CSI triggering state table or a corresponding SRS resource set included in an aperiodic SRS triggering state table. In some cases, the aperiodic CSI triggering state table or the aperiodic SRS triggering state table may be a same table to which a DCI message maps in order to trigger link management during active time. In some cases, the link management triggering state index may be one of a first subset of a total number of CSI RS resource sets included in the aperiodic CSI triggering state table, a first subset of a total number of SRS resource sets included in the aperiodic SRS triggering state table, or a combination thereof. In some cases, base station 105-b may transmit, to UE 115-b, an indication of the first subset via either RRC signaling or a MAC CE signaling in advance of the WUS occasion (e.g., at 510). In some cases, the wake-up message component may include k bits for encoding the CSI triggering state index, where the first subset may include a first $2^k$ CSI triggering state resource sets of the CSI triggering state table. In some cases, the wake-up message component may include k bits for encoding the link management triggering state index, where the first subset may include a first $2^k$ CSI triggering states of the aperiodic CSI triggering state table that each satisfy a triggering offset beyond a triggering threshold when triggered.

In some cases, the aperiodic CSI triggering state table may be different from a table to which a DCI message maps in order to trigger link management. In some cases, the aperiodic CSI triggering state table may be different from a table to which a DCI message maps in order to trigger link management, but may include one or more indices that reference a table to which a DCI message maps in order to trigger link management. In some cases, the corresponding CSI RS resource set to which the link management triggering state index is mapped may include a set of resource sets for differently-purposed CSI RSs.

At 520, UE 115-b may monitor, in a connected mode during DRX operation, a WUS occasion associated with (e.g., occurring prior to or within) a DRX on-duration.

At 525, base station 105-b may transmit the wake-up message during a WUS occasion associated with (e.g., occurring prior to or within) the DRX on-duration associated with UE 115-b and UE 115-b may detect the wake-up message during the WUS occasion.

At 530, UE 115-b may identify, from the wake-up message, the wake-up message component that triggers a link management procedure by UE 115-b. In some cases, identifying the wake-up message component may include identifying that the link management procedure triggered by the wake-up message component is for a group of UEs 115 (e.g., a group of UEs 115 including UE 115-b). In some cases, identifying the wake-up message component may include identifying, from the wake-up message component, the link management triggering state index.

In some examples, UE 115-b may map the link management triggering state index to a corresponding CSI RS resource set included in an aperiodic CSI triggering state table or a corresponding SRS resource set included in an aperiodic SRS triggering state table, where the aperiodic CSI triggering state table or the aperiodic SRS triggering state table may be a same table to which a DCI message maps in order to trigger link management. In some cases, the link management triggering state index may be one of a first subset of a total number of CSI RS resource sets included in the aperiodic CSI triggering state table, a first subset of a total number of SRS resource sets included in the aperiodic SRS triggering state table, or a combination thereof. In some cases, the wake-up message component may include k bits for encoding the link management triggering state index, where the first subset may include a first $2^k$ CSI triggering states of the aperiodic CSI triggering state table. In some cases, the wake-up message component may include k bits for encoding the link management triggering state index, where the first subset may include a first $2^k$ CSI triggering states of the aperiodic CSI triggering state table that each satisfy a triggering offset beyond a triggering threshold when triggered.

In some cases, UE 115-b may map the link management triggering state index to a corresponding CSI RS resource set included in a CSI triggering state table, where the CSI triggering state table may be different from a table to which a DCI message maps in order to trigger link management. In some cases, UE 115-b may map the link management triggering state index to a CSI RS resource set included in a CSI triggering state table, where the CSI triggering state table may be different from a table to which a DCI message maps in order to trigger link management, but may include one or more indices that reference a table to which a DCI message maps in order to trigger link management. In some cases, the corresponding CSI RS resource set to which the CSI triggering state index is mapped may include one or more sets of resource sets for differently-purposed CSI RSs.

At 535, UE 115-b and base station 105-b may perform link management based on (e.g., in accordance with) the wake-up message component. In some cases, UE 115-b may identify uplink reporting resources for reporting link management measurements and transmit, to base station 105-b, one or more link management reports using the uplink reporting resources. In some cases, the uplink reporting resources may be configured prior to the WUS occasion (e.g., via configuration signaling at 510). In some cases, the uplink reporting resources may be indicated via the wake-up message component.

Figure 6:
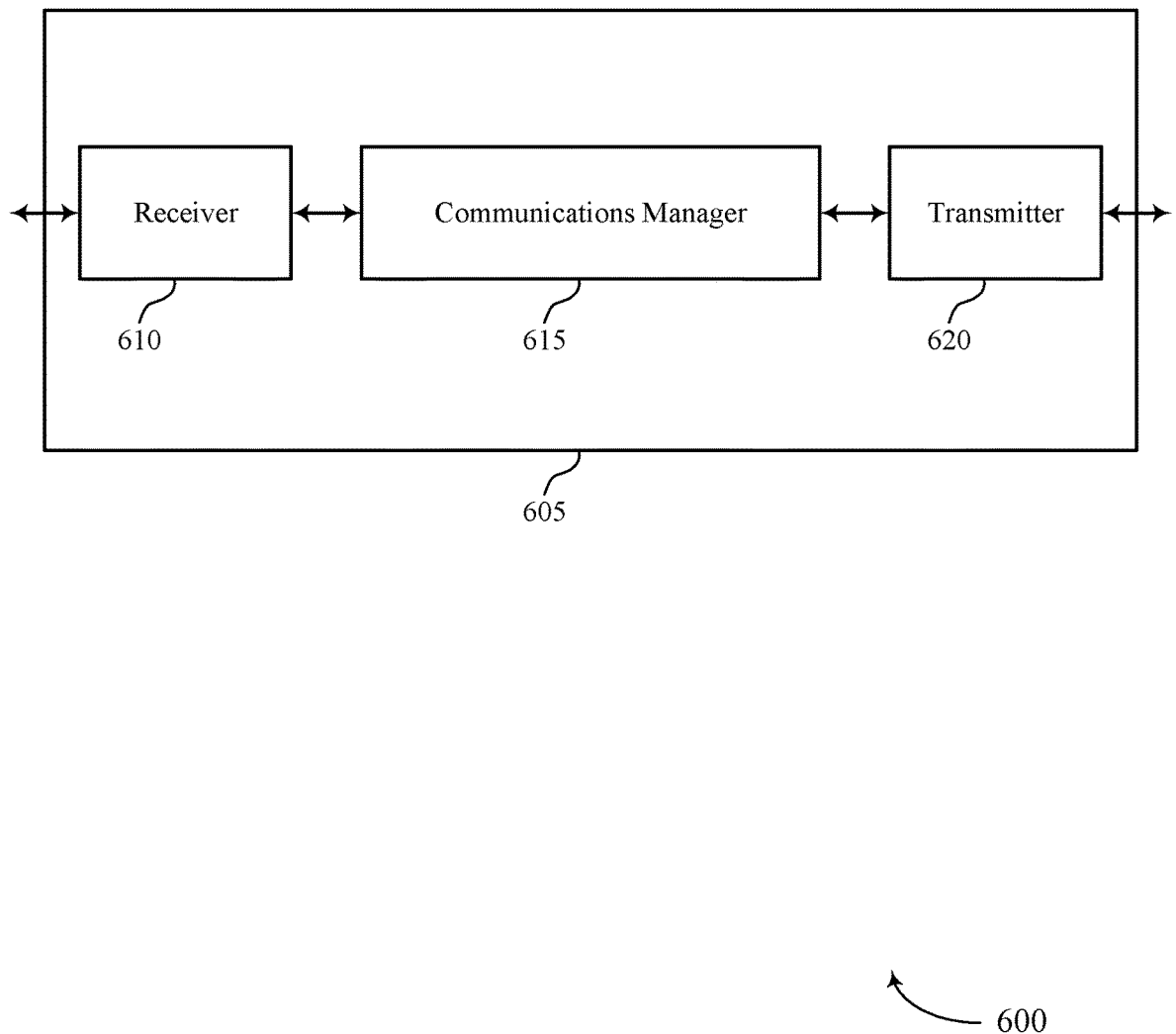
FIGS. 6 and 7 show block diagrams of devices that support WUS assisted link management in accordance with aspects of the present disclosure.

FIG. 6 shows a block diagram 600 of a device 605 that supports WUS assisted link management in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to intra-device collision handling, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may monitor, in a connected mode during DRX operation, a WUS occasion associated with a DRX on-duration, detect a wake-up message during the WUS occasion, the wake-up message being indicative of whether the UE is to wake-up to monitor a control channel during the DRX on-duration, identify, from the wake-up message, a wake-up message component that triggers a link management procedure by the UE, and perform link management based on the wake-up message component. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some examples, the communications manager 615 may be implemented as an integrated circuit or chipset for a mobile device modem, and the receiver 605 and transmitter 620 may be implemented as analog components (e.g., amplifiers, filters, antennas, etc.) coupled with the mobile device modem to enable wireless transmission and reception over one or more bands.

The actions performed by the communications manager 615 as described herein may be implemented to realize one or more potential advantages. For example, communications manager 615 may increase communication reliability and latency at a UE 115 by enabling the UE 115 to perform link management and maintain a communications quality (e.g., link quality) before transmitting communications to or receiving communications from a base station. Similarly, communications manager 615 may save power and increase battery life at a UE 115 by strategically lowering an amount of link management that is to be performed during a DRX mode.

Figure 7:
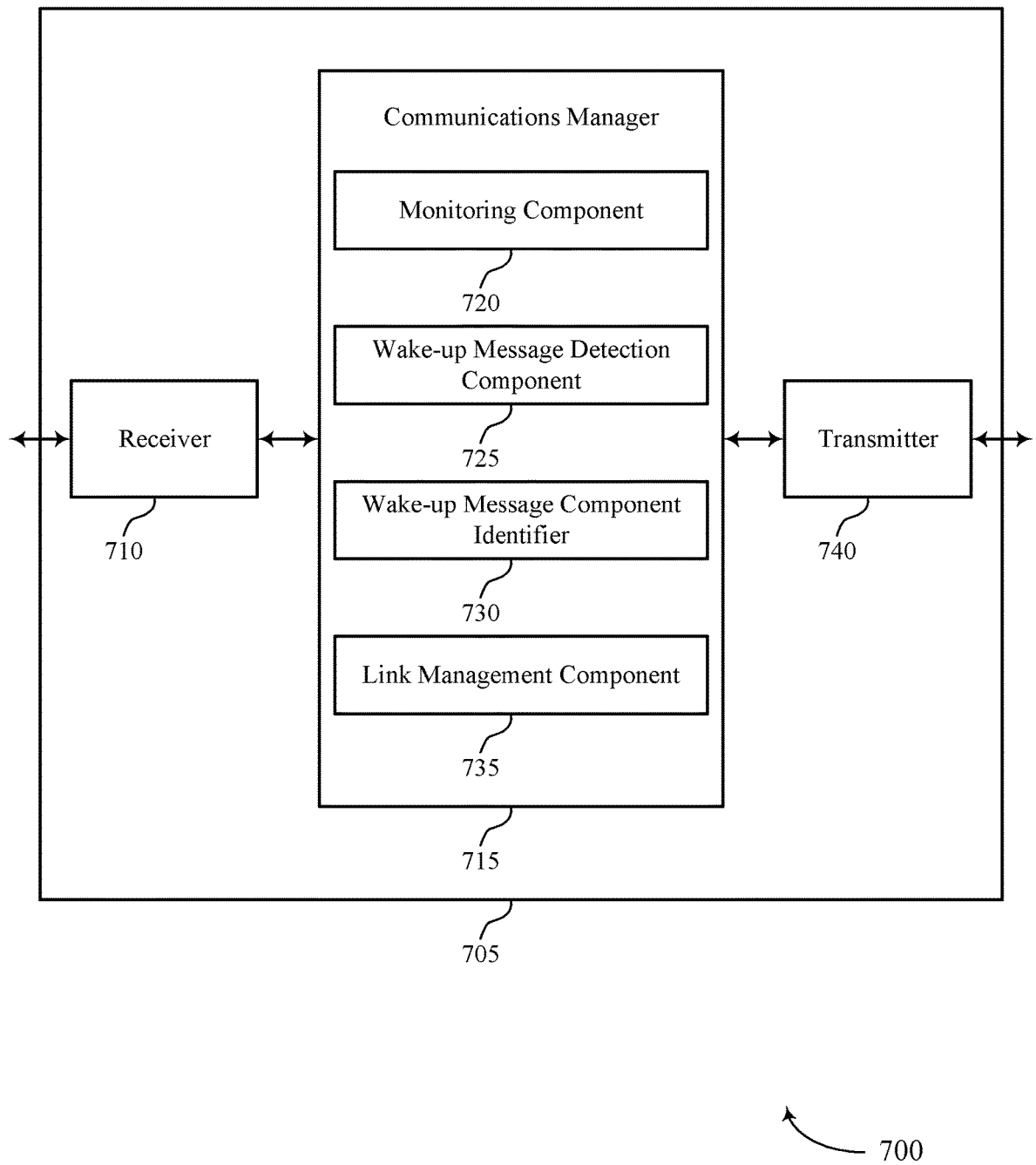

FIG. 7 shows a block diagram 700 of a device 705 that supports WUS assisted link management in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to intra-device collision handling, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a monitoring component 720, a wake-up message detection component 725, a wake-up message component identifier 730, and a link management component 735. The communications manager 715 may be an example of aspects of the communications manager 910 described herein.

The monitoring component 720 may monitor, in a connected mode during DRX operation, a WUS occasion associated with a DRX on-duration. The wake-up message detection component 725 may detect a wake-up message during the WUS occasion, the wake-up message being indicative of whether the UE is to wake-up to monitor a control channel during the DRX on-duration. The wake-up message component identifier 730 may identify, from the wake-up message, a wake-up message component that triggers a link management procedure by the UE. The link management component 735 may perform link management based on the wake-up message component.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

A processor of a UE 115 (e.g., controlling the receiver 710, the transmitter 740, or the transceiver 920 as described with reference to FIG. 9) may increase communication reliability and accuracy by enabling the UE 115 to perform link management and maintain a communications quality (e.g., link quality) before transmitting communications to or receiving communications from a base station (e.g., via implementation of system components described with reference to FIG. 8). Further, the processor of UE 115 may identify one or more aspects of a WUS configuration to perform the processes described herein. The processor of the UE 115 may use the WUS configuration to simplify DRX communications and improve communication accuracy and reliability to further save power and increase battery life at the UE 115 (e.g., by strategically lowering an amount of link management that is to be performed during a DRX mode).

Figure 8:
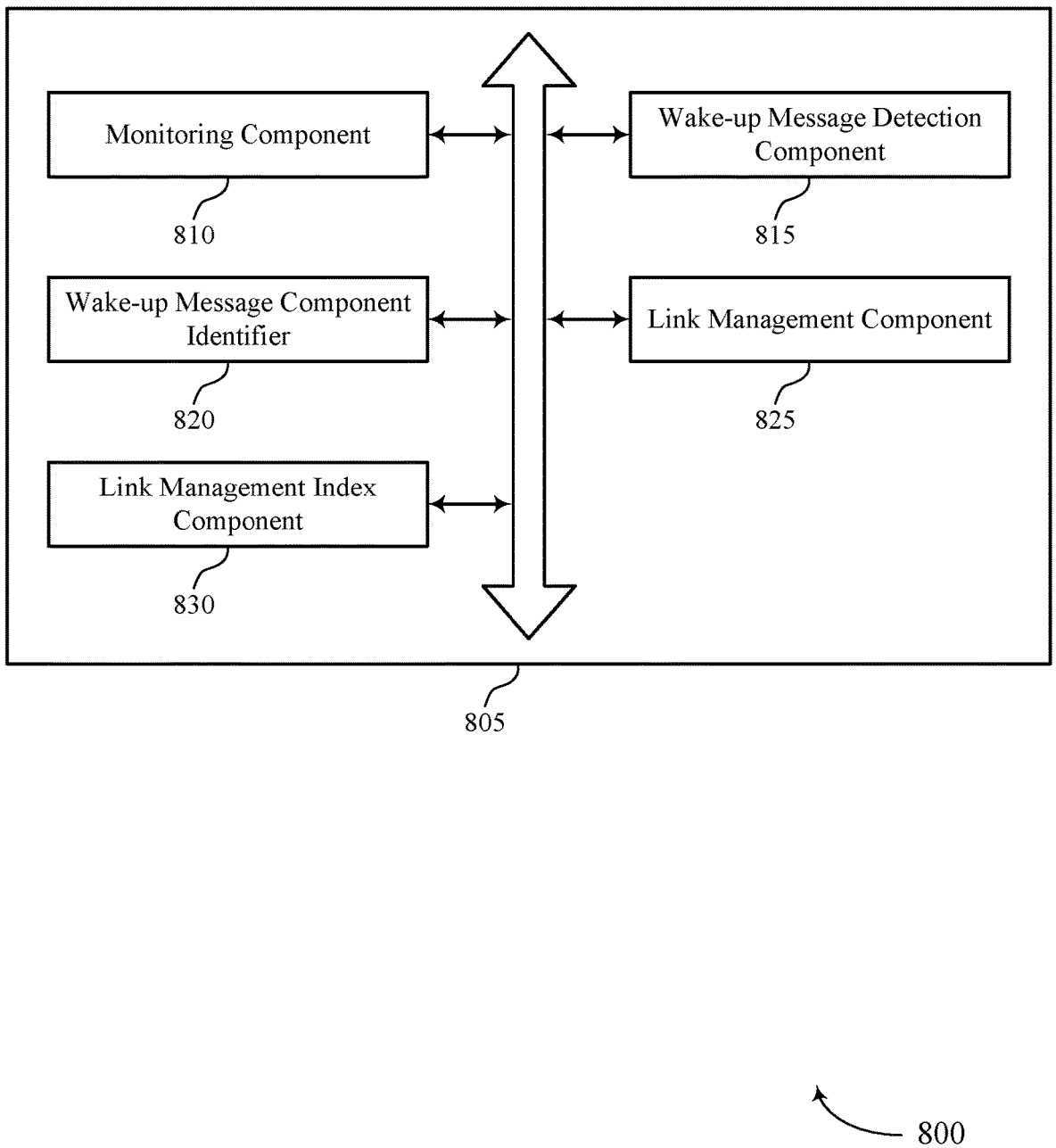
FIG. 8 shows a block diagram of a communications manager that supports WUS assisted link management in accordance with aspects of the present disclosure.

FIG. 8 shows a block diagram 800 of a communications manager 805 that supports WUS assisted link management in accordance with aspects of the present disclosure. The communications manager 805 may be an example of aspects of a communications manager 615, a communications manager 715, or a communications manager 910 described herein. The communications manager 805 may include a monitoring component 810, a wake-up message detection component 815, a wake-up message component identifier 820, a link management component 825, and a link management index component 830. Each of these modules may communicate, directly or indirectly, with one another (e.g., via one or more buses).

The monitoring component 810 may monitor, in a connected mode during DRX operation, a WUS occasion associated with a DRX on-duration. The wake-up message detection component 815 may detect a wake-up message during the WUS occasion, the wake-up message being indicative of whether the UE is to wake-up to monitor a control channel during the DRX on-duration.

The wake-up message component identifier 820 may identify, from the wake-up message, a wake-up message component that triggers a link management procedure by the UE. In some examples, the wake-up message component identifier 820 may receive, in advance of the WUS occasion, an indication of a size of the wake-up message component. In some examples, the wake-up message component identifier 820 may identify that the link management procedure triggered by the wake-up message component is for a group of UEs. In some cases, the indication is UE-specific and is received via RRC signaling or a MAC CE signaling.

The link management component 825 may perform link management based on the wake-up message component. In some examples, the link management component 825 may identify uplink reporting resources for reporting link management measurements. In some examples, the link management component 825 may transmit one or more link management reports using the uplink reporting resources. In some cases, the uplink reporting resources are configured prior to the WUS occasion. In some cases, the uplink reporting resources are indicated via the wake-up message component.

The link management index component 830 may identify, from the wake-up message component, a link management triggering state index. In some examples, the link management index component 830 may map the link management triggering state index to a corresponding CSI RS resource set included in an aperiodic CSI triggering state table or a corresponding SRS resource set included in an aperiodic SRS triggering state table, where the aperiodic CSI triggering state table or the aperiodic SRS triggering state table is a same table to which a DCI message maps in order to trigger link management. In some examples, the link management index component 830 may receive an indication of the first subset via either RRC signaling or a MAC CE signaling in advance of the WUS occasion. In some examples, the link management index component 830 may map the link management triggering state index to a corresponding CSI RS resource set included in a CSI triggering state table, where the CSI triggering state table is different from a table to which a DCI message maps in order to trigger link management.

In some examples, the link management index component 830 may map the link management triggering state index to a corresponding CSI RS resource set included in a CSI triggering state table, where the CSI triggering state table is different from a table to which a DCI message maps in order to trigger link management, but includes one or more indices that reference a table to which a DCI message maps in order to trigger link management. In some cases, the link management triggering state index is one of a first subset of a total number of CSI RS resource sets included in the aperiodic CSI triggering state table, a first subset of a total number of SRS resource sets included in the aperiodic SRS triggering state table, or a combination thereof. In some cases, the wake-up message component includes k bits for encoding the link management triggering state index, and where the first subset includes a first $2^k$ CSI triggering states of the aperiodic CSI triggering state table.

In some cases, the wake-up message component includes k bits for encoding the CSI triggering state index, and where the first subset includes a first $2^k$ CSI triggering state resource sets of the aperiodic CSI triggering state table that each satisfy a triggering offset beyond a triggering threshold when triggered. In some cases, the corresponding CSI RS resource set to which the CSI triggering state index is mapped includes a set of resource sets for differently-purposed CSI RSs.

Figure 9:
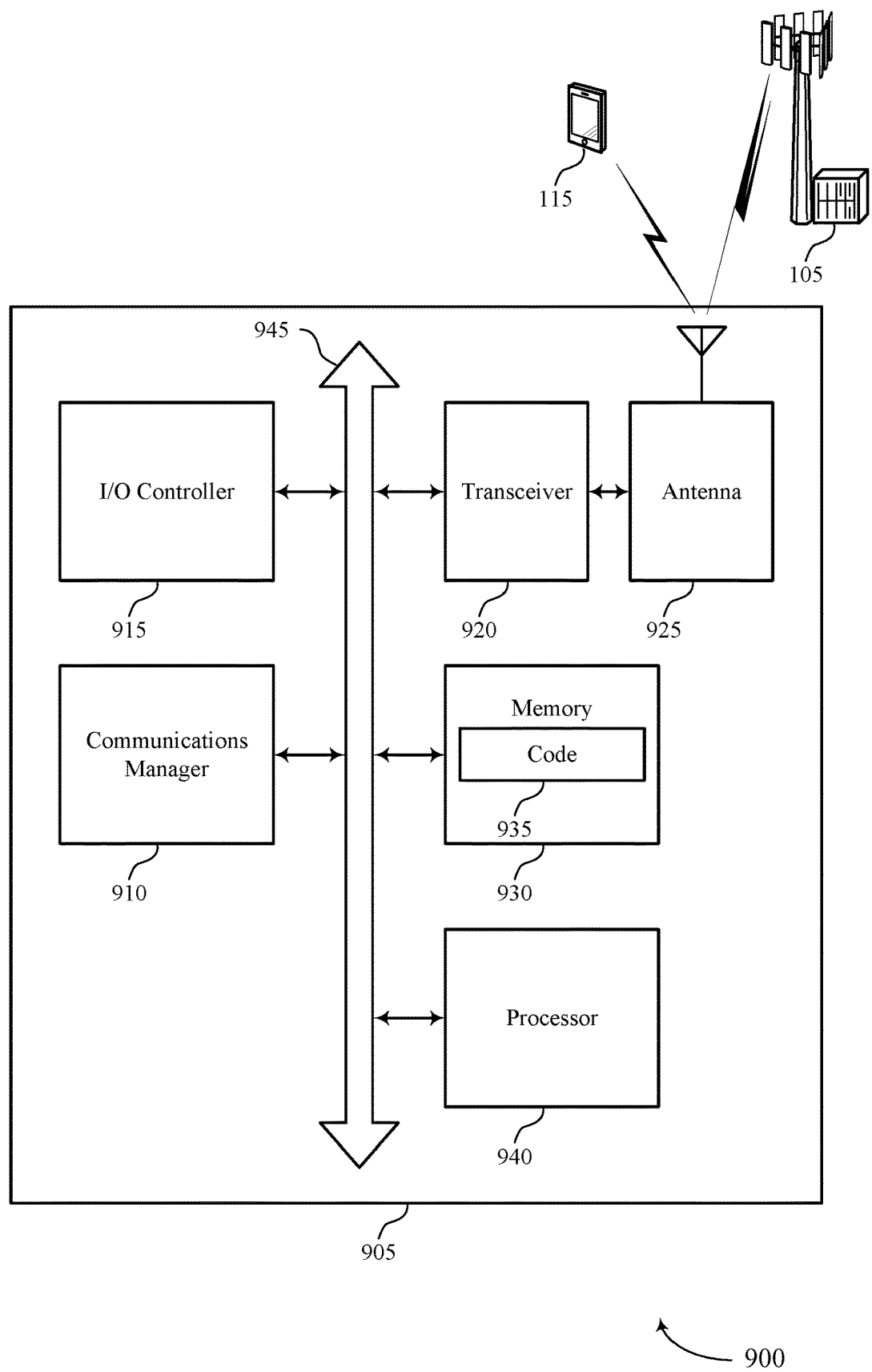
FIG. 9 shows a diagram of a system including a device that supports WUS assisted link management in accordance with aspects of the present disclosure.

FIG. 9 shows a diagram of a system 900 including a device 905 that supports WUS assisted link management in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910. These components may be in electronic communication via one or more buses (e.g., bus 945).

The communications manager 910 may monitor, in a connected mode during DRX operation, a WUS occasion associated with a DRX on-duration, detect a wake-up message during the WUS occasion, the wake-up message being indicative of whether the UE is to wake-up to monitor a control channel during the DRX on-duration, identify, from the wake-up message, a wake-up message component that triggers a link management procedure by the UE, and perform link management based on the wake-up message component.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the device 905 may include a single antenna 925, or the device 905 may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting intra-device collision handling).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
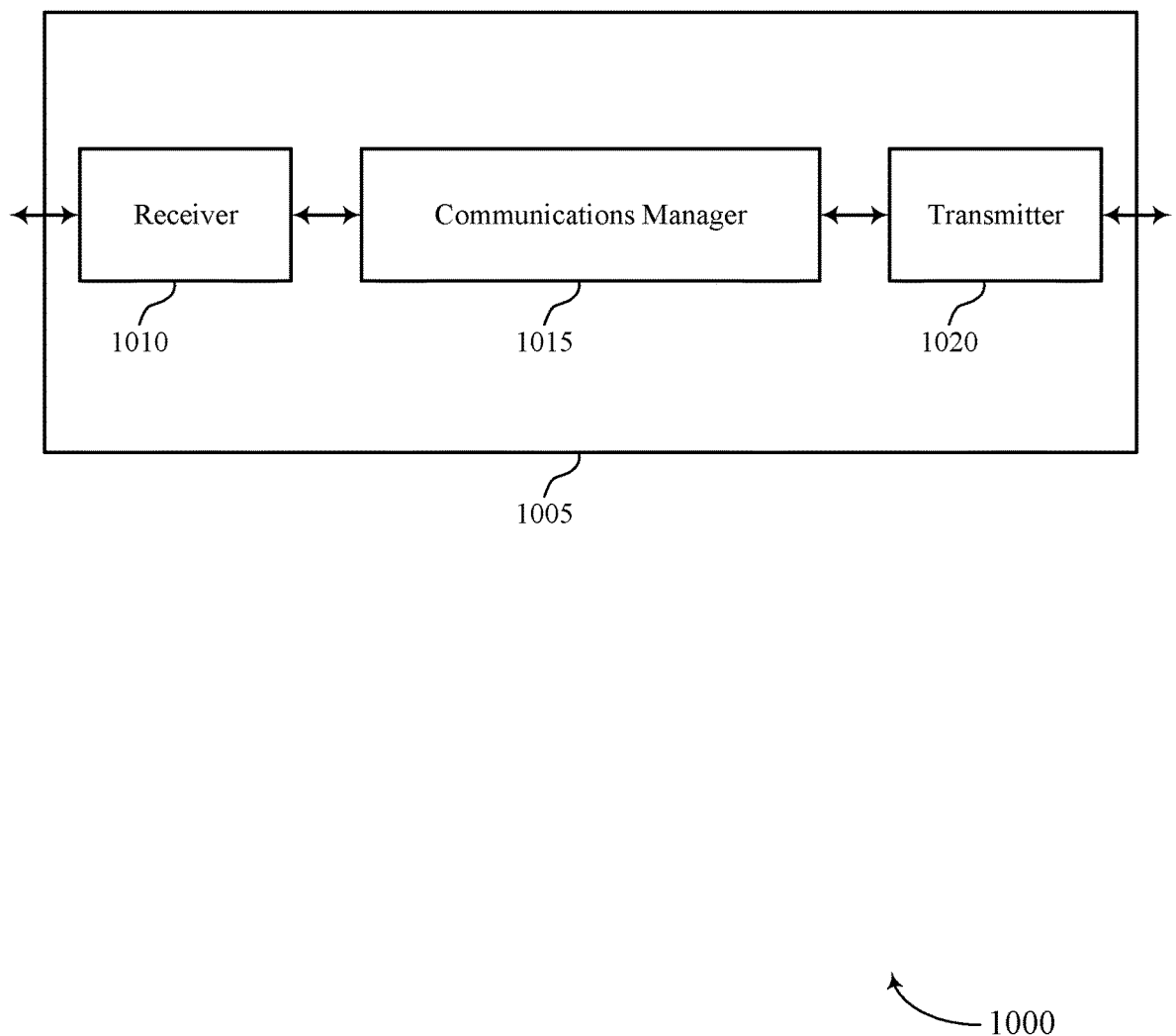
FIGS. 10 and 11 show block diagrams of devices that support WUS assisted link management in accordance with aspects of the present disclosure.

FIG. 10 shows a block diagram 1000 of a device 1005 that supports WUS assisted link management in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to WUS assisted link management, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a UE operating according to DRX in a connected mode, configure a wake-up message for the UE, the wake-up message being indicative of whether the UE is to wake-up to monitor a control channel during a DRX on-duration, and where the wake-up message includes a wake-up message component that triggers a link management procedure, transmit the wake-up message during a WUS occasion associated with the DRX on-duration associated with the UE, and perform link management in accordance with the wake-up message component. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

The actions performed by the communications manager 1015 as described herein may be implemented to realize one or more potential advantages. For example, communications manager may increase communication reliability and latency at a UE 115 by enabling the UE 115 to perform link management (e.g., via the WUS) and maintain a communications quality (e.g., link quality) before transmitting communications to or receiving communications from the communications manager 1015.

Figure 11:
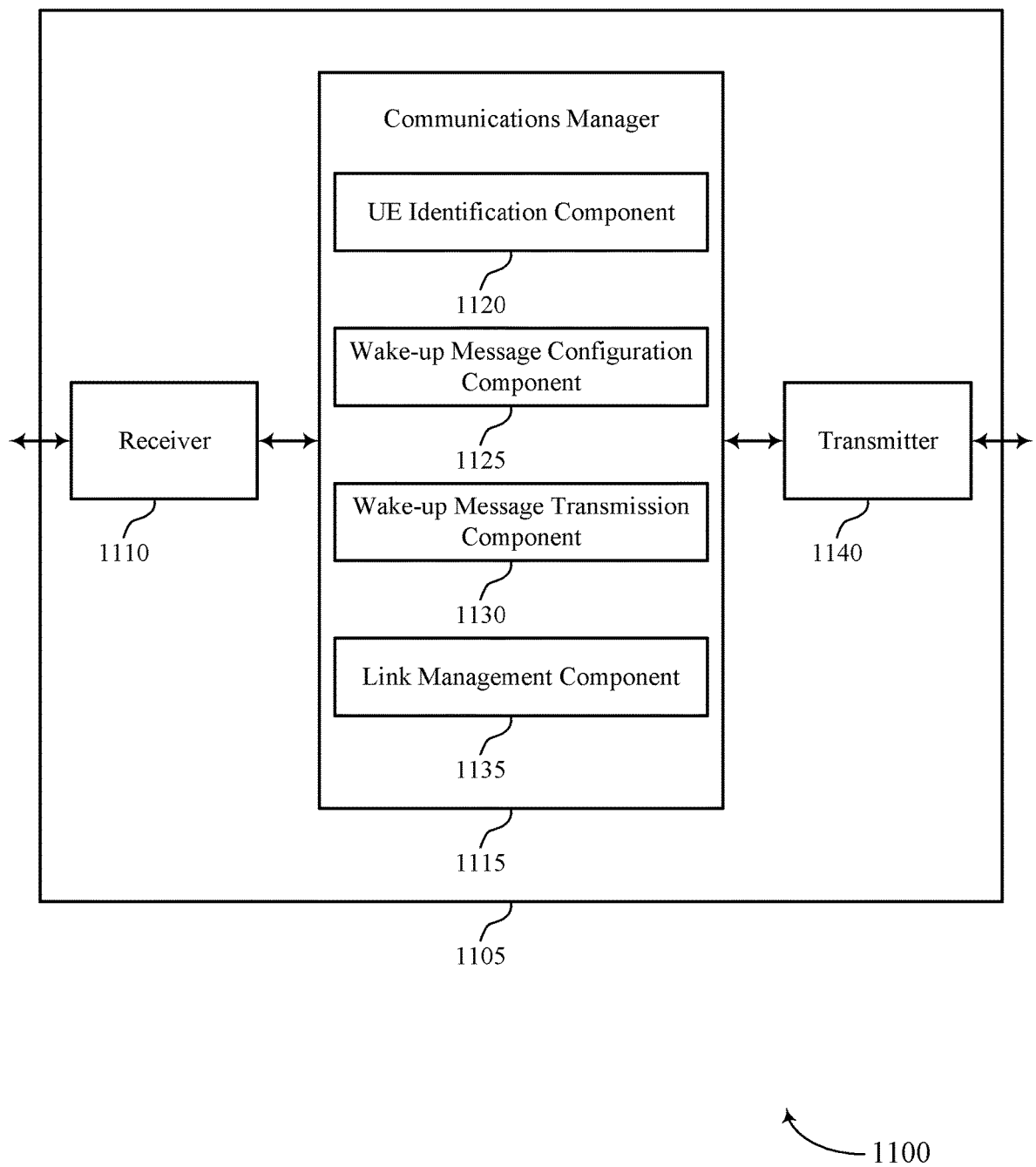

FIG. 11 shows a block diagram 1100 of a device 1105 that supports WUS assisted link management in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to WUS assisted link management, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an UE identification component 1120, a wake-up message configuration component 1125, a wake-up message transmission component 1130, and a link management component 1135. The communications manager 1115 may be an example of aspects of the communications manager 1310 described herein.

The UE identification component 1120 may identify a UE operating according to DRX in a connected mode. The wake-up message configuration component 1125 may configure a wake-up message for the UE, the wake-up message being indicative of whether the UE is to wake-up to monitor a control channel during a DRX on-duration, and where the wake-up message includes a wake-up message component that triggers a link management procedure. The wake-up message transmission component 1130 may transmit the wake-up message during a WUS occasion associated with the DRX on-duration associated with the UE. The link management component 1135 may perform link management in accordance with the wake-up message component.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
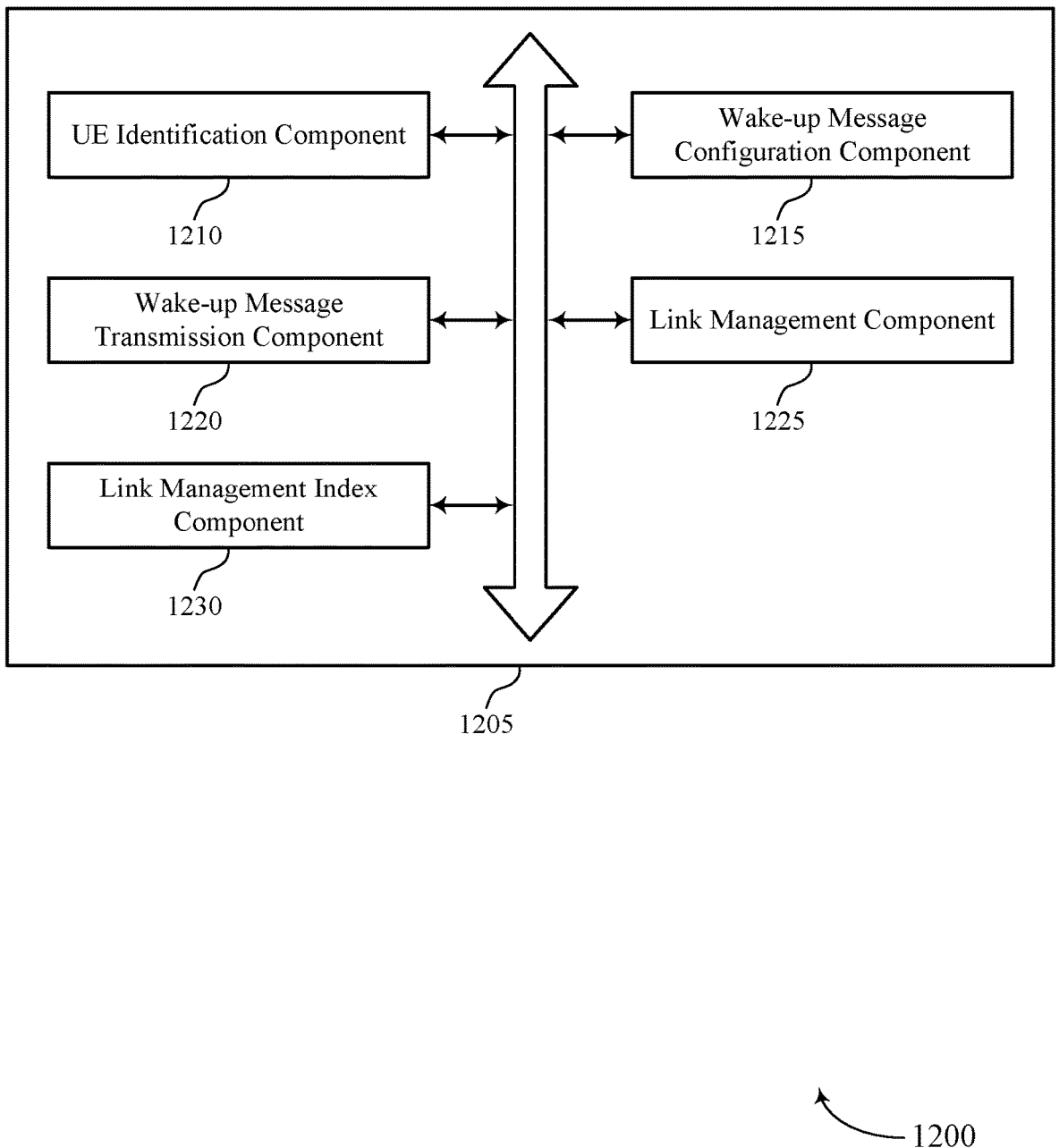
FIG. 12 shows a block diagram of a communications manager that supports WUS assisted link management in accordance with aspects of the present disclosure.

FIG. 12 shows a block diagram 1200 of a communications manager 1205 that supports WUS assisted link management in accordance with aspects of the present disclosure. The communications manager 1205 may be an example of aspects of a communications manager 1015, a communications manager 1115, or a communications manager 1310 described herein. The communications manager 1205 may include an UE identification component 1210, a wake-up message configuration component 1215, a wake-up message transmission component 1220, a link management component 1225, and a link management index component 1230. Each of these modules may communicate, directly or indirectly, with one another (e.g., via one or more buses).

The UE identification component 1210 may identify a UE operating according to DRX in a connected mode. The wake-up message configuration component 1215 may configure a wake-up message for the UE, the wake-up message being indicative of whether the UE is to wake-up to monitor a control channel during a DRX on-duration, and where the wake-up message includes a wake-up message component that triggers a link management procedure. In some examples, the wake-up message configuration component 1215 may configure the wake-up message component to apply to a group of UEs operating according to DRX in the connected mode, the group of UEs including the identified UE.

The wake-up message transmission component 1220 may transmit the wake-up message during a WUS occasion associated with the DRX on-duration associated with the UE. In some examples, the wake-up message transmission component 1220 may transmit, in advance of the WUS occasion, an indication of a size of the wake-up message component. In some cases, the indication is UE-specific and is received via RRC signaling or a MAC CE signaling.

The link management component 1225 may perform link management in accordance with the wake-up message component. In some examples, the link management component 1225 may receive one or more link management reports using uplink reporting resources configured by the base station prior to the WUS occasion. In some examples, the link management component 1225 may receive one or more link management reports using uplink reporting resources indicated via the wake-up message component.

The link management index component 1230 may include, in the wake-up message component, a link management triggering state index, where the link management triggering state index is mapped to a corresponding CSI RS resource set included in an aperiodic CSI triggering state table or a corresponding SRS resource set included in an aperiodic SRS triggering state table. In some examples, the link management index component 1230 may transmit an indication of the first subset via either RRC signaling or a MAC CE signaling in advance of the WUS occasion.

In some cases, the aperiodic CSI triggering state table or the aperiodic SRS triggering state table is a same table to which a DCI message maps in order to trigger link management. In some cases, the link management triggering state index is one of a first subset of a total number of CSI RS resource sets included in the aperiodic CSI triggering state table, a first subset of a total number of SRS resource sets included in the aperiodic SRS triggering state table, or a combination thereof. In some cases, the wake-up message component includes k bits for encoding the CSI triggering state index, and where the first subset includes a first $2^k$ CSI triggering state resource sets of the CSI triggering state table. In some cases, the wake-up message component includes k bits for encoding the link management triggering state index, and where the first subset includes a first $2^k$ CSI triggering states of the aperiodic CSI triggering state table that each satisfy a triggering offset beyond a triggering threshold when triggered.

In some cases, the aperiodic CSI triggering state table is different from a table to which a DCI message maps in order to trigger link management. In some cases, the aperiodic CSI triggering state table is different from a table to which a DCI message maps in order to trigger link management, but includes one or more indices that reference a table to which a DCI message maps in order to trigger link management. In some cases, the corresponding CSI RS resource set to which the link management triggering state index is mapped includes a set of resource sets for differently-purposed CSI RSs.

Figure 13:
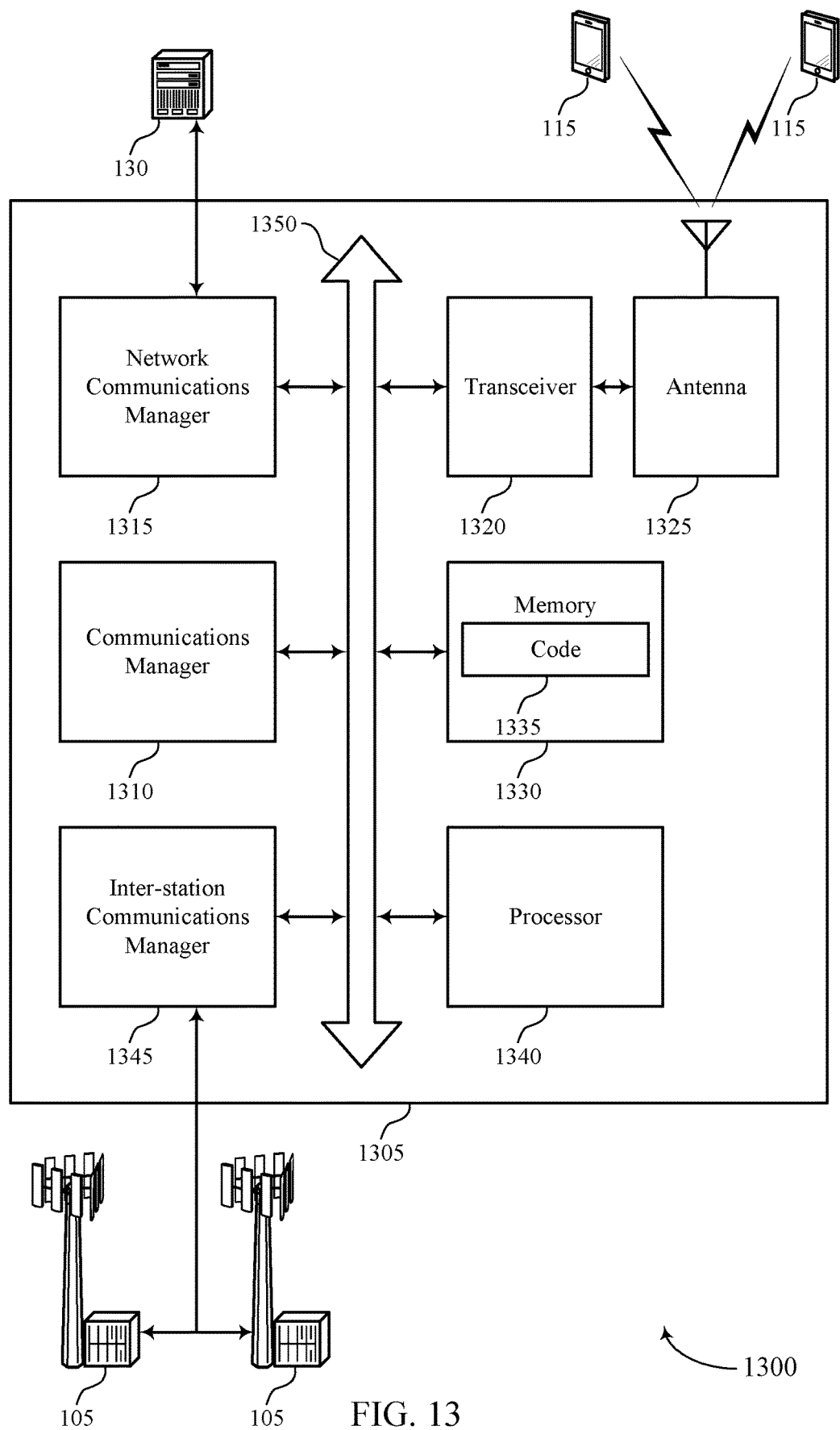
FIG. 13 shows a diagram of a system including a device that supports WUS assisted link management in accordance with aspects of the present disclosure.

FIG. 13 shows a diagram of a system 1300 including a device 1305 that supports WUS assisted link management in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify a UE operating according to DRX in a connected mode, configure a wake-up message for the UE, the wake-up message being indicative of whether the UE is to wake-up to monitor a control channel during a DRX on-duration, and where the wake-up message includes a wake-up message component that triggers a link management procedure, transmit the wake-up message during a WUS occasion associated with the DRX on-duration associated with the UE, and perform link management in accordance with the wake-up message component.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting WUS assisted link management).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
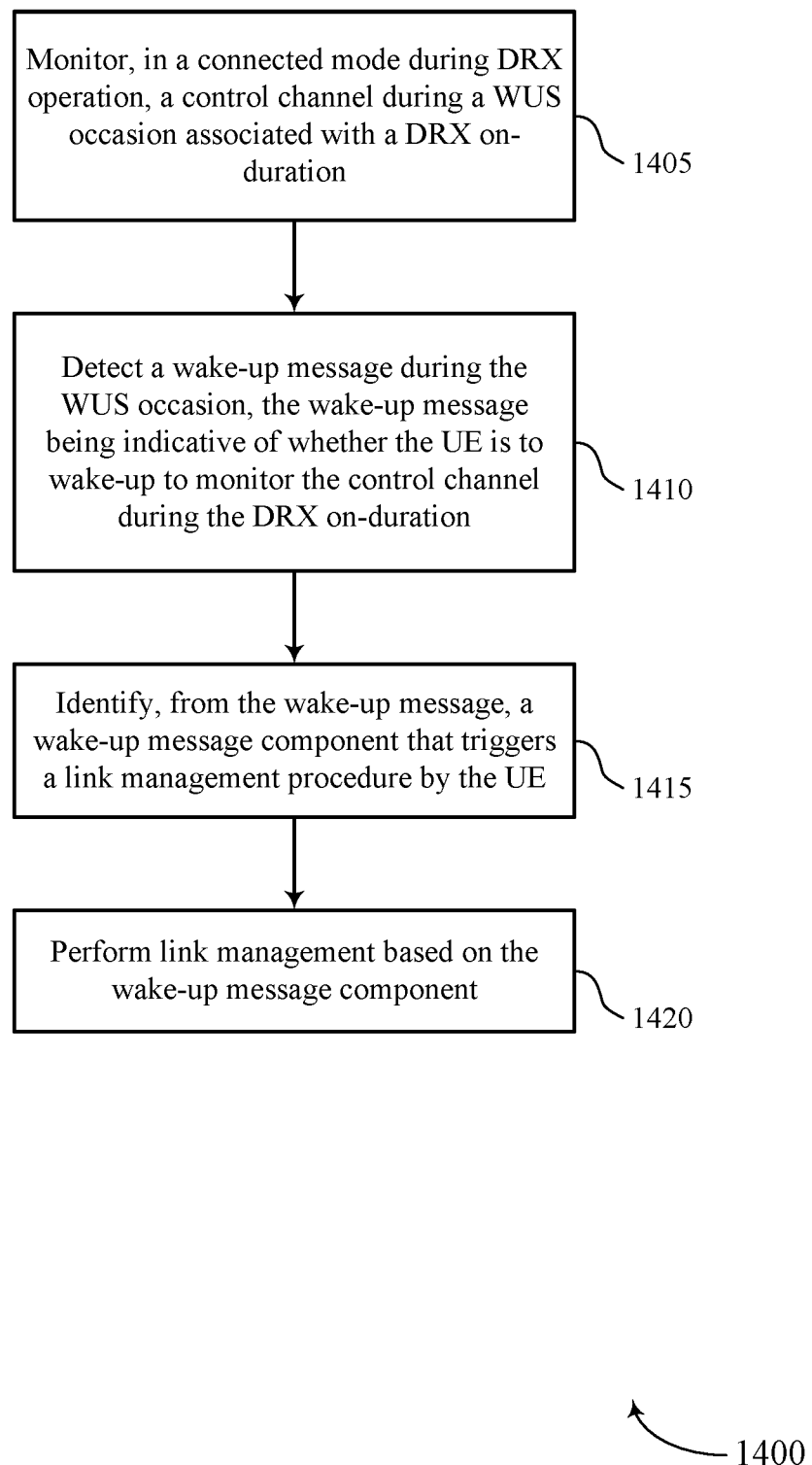
FIGS. 14 through 17 show flowcharts illustrating methods that support WUS assisted link management in accordance with aspects of the present disclosure.

FIG. 14 shows a flowchart illustrating a method 1400 that supports WUS assisted link management in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may monitor, in a connected mode during DRX operation, a control channel during a WUS occasion associated with a DRX on-duration. The operations of 1405 may be performed according to the methods described herein. In some examples, aspects of the operations of 1405 may be performed by a monitoring component as described with reference to FIGS. 6 through 9.

At 1410, the UE may detect a wake-up message during the WUS occasion, the wake-up message being indicative of whether the UE is to wake-up to monitor the control channel during the DRX on-duration. The operations of 1410 may be performed according to the methods described herein. In some examples, aspects of the operations of 1410 may be performed by a wake-up message detection component as described with reference to FIGS. 6 through 9.

At 1415, the UE may identify, from the wake-up message, a wake-up message component that triggers a link management procedure by the UE. The operations of 1415 may be performed according to the methods described herein. In some examples, aspects of the operations of 1415 may be performed by a wake-up message component identifier as described with reference to FIGS. 6 through 9.

At 1420, the UE may perform link management based on the wake-up message component. The operations of 1420 may be performed according to the methods described herein. In some examples, aspects of the operations of 1420 may be performed by a link management component as described with reference to FIGS. 6 through 9.

Figure 15:
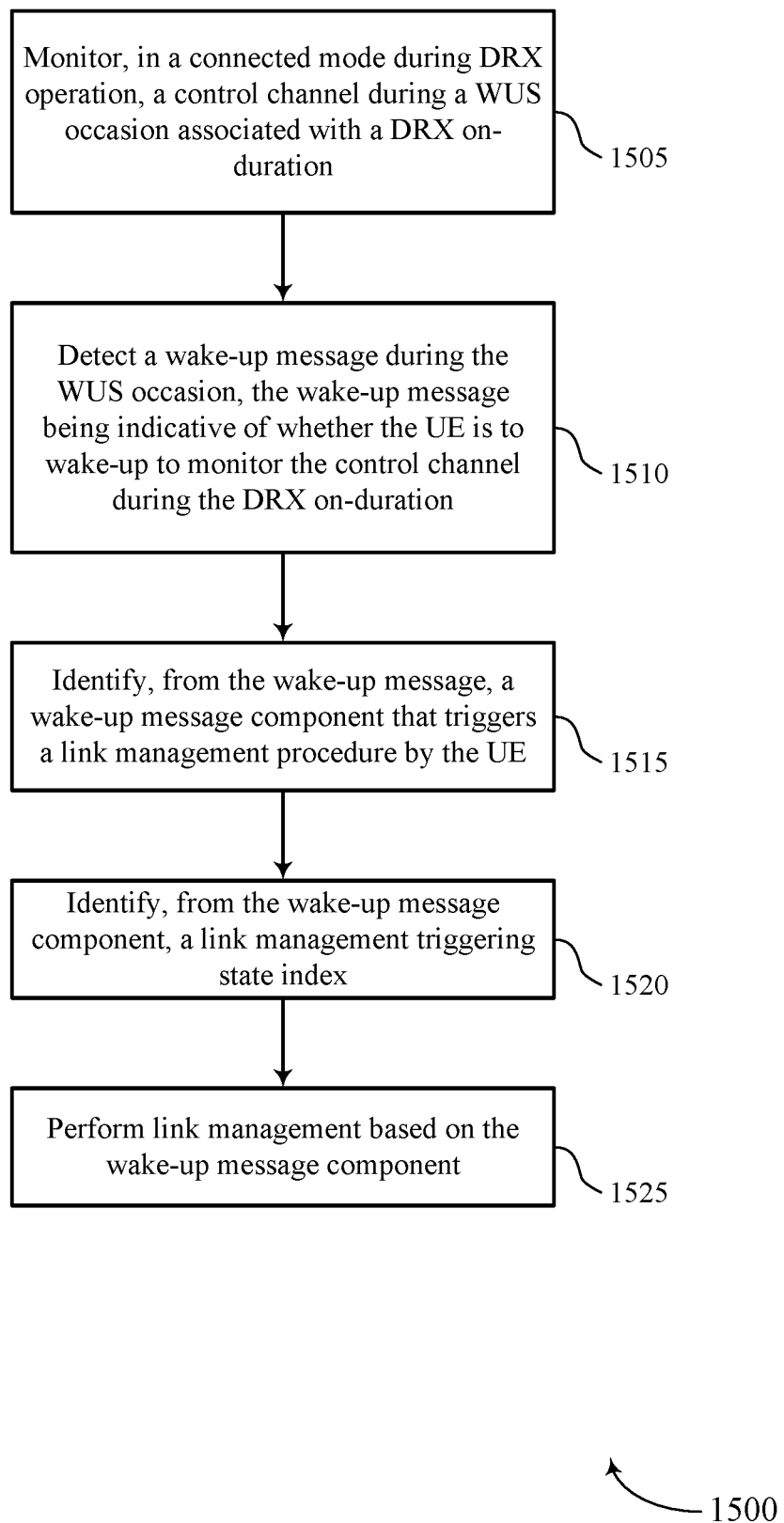

FIG. 15 shows a flowchart illustrating a method 1500 that supports WUS assisted link management in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may monitor, in a connected mode during DRX operation, a control channel during a WUS occasion associated with a DRX on-duration. The operations of 1505 may be performed according to the methods described herein. In some examples, aspects of the operations of 1505 may be performed by a monitoring component as described with reference to FIGS. 6 through 9.

At 1510, the UE may detect a wake-up message during the WUS occasion, the wake-up message being indicative of whether the UE is to wake-up to monitor the control channel during the DRX on-duration. The operations of 1510 may be performed according to the methods described herein. In some examples, aspects of the operations of 1510 may be performed by a wake-up message detection component as described with reference to FIGS. 6 through 9.

At 1515, the UE may identify, from the wake-up message, a wake-up message component that triggers a link management procedure by the UE. The operations of 1515 may be performed according to the methods described herein. In some examples, aspects of the operations of 1515 may be performed by a wake-up message component identifier as described with reference to FIGS. 6 through 9.

At 1520, the UE may identify, from the wake-up message component, a link management triggering state index. The operations of 1520 may be performed according to the methods described herein. In some examples, aspects of the operations of 1520 may be performed by a link management index component as described with reference to FIGS. 6 through 9.

At 1525, the UE may perform link management based on the wake-up message component. The operations of 1525 may be performed according to the methods described herein. In some examples, aspects of the operations of 1525 may be performed by a link management component as described with reference to FIGS. 6 through 9.

Figure 16:
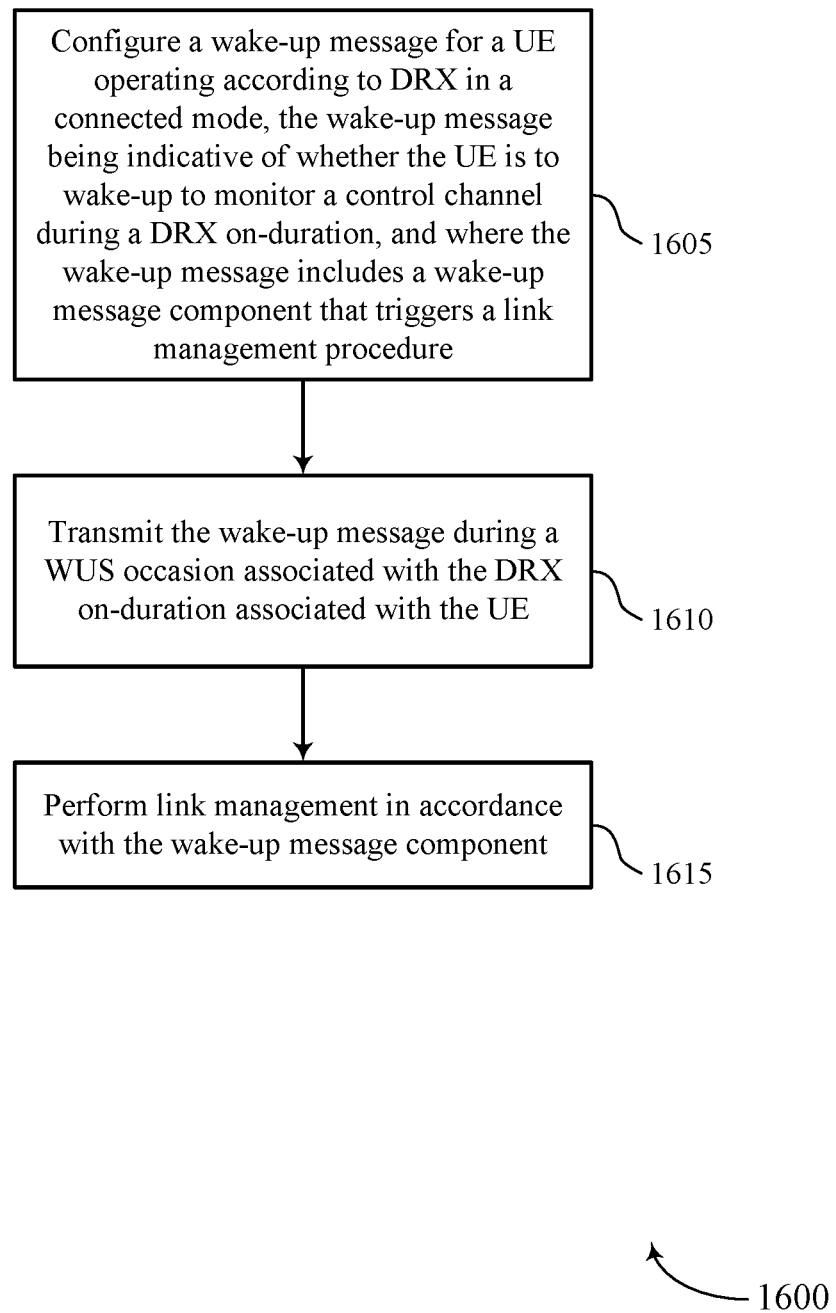

FIG. 16 shows a flowchart illustrating a method 1600 that supports WUS assisted link management in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may configure a wake-up message for a UE operating according to DRX in a connected mode, the wake-up message being indicative of whether the UE is to wake-up to monitor a control channel during a DRX on-duration, and where the wake-up message includes a wake-up message component that triggers a link management procedure. The operations of 1605 may be performed according to the methods described herein. In some examples, aspects of the operations of 1605 may be performed by a wake-up message configuration component as described with reference to FIGS. 10 through 13.

At 1610, the base station may transmit the wake-up message during a WUS occasion associated with the DRX on-duration associated with the UE. The operations of 1610 may be performed according to the methods described herein. In some examples, aspects of the operations of 1610 may be performed by a wake-up message transmission component as described with reference to FIGS. 10 through 13.

At 1615, the base station may perform link management in accordance with the wake-up message component. The operations of 1615 may be performed according to the methods described herein. In some examples, aspects of the operations of 1615 may be performed by a link management component as described with reference to FIGS. 10 through 13.

Figure 17:
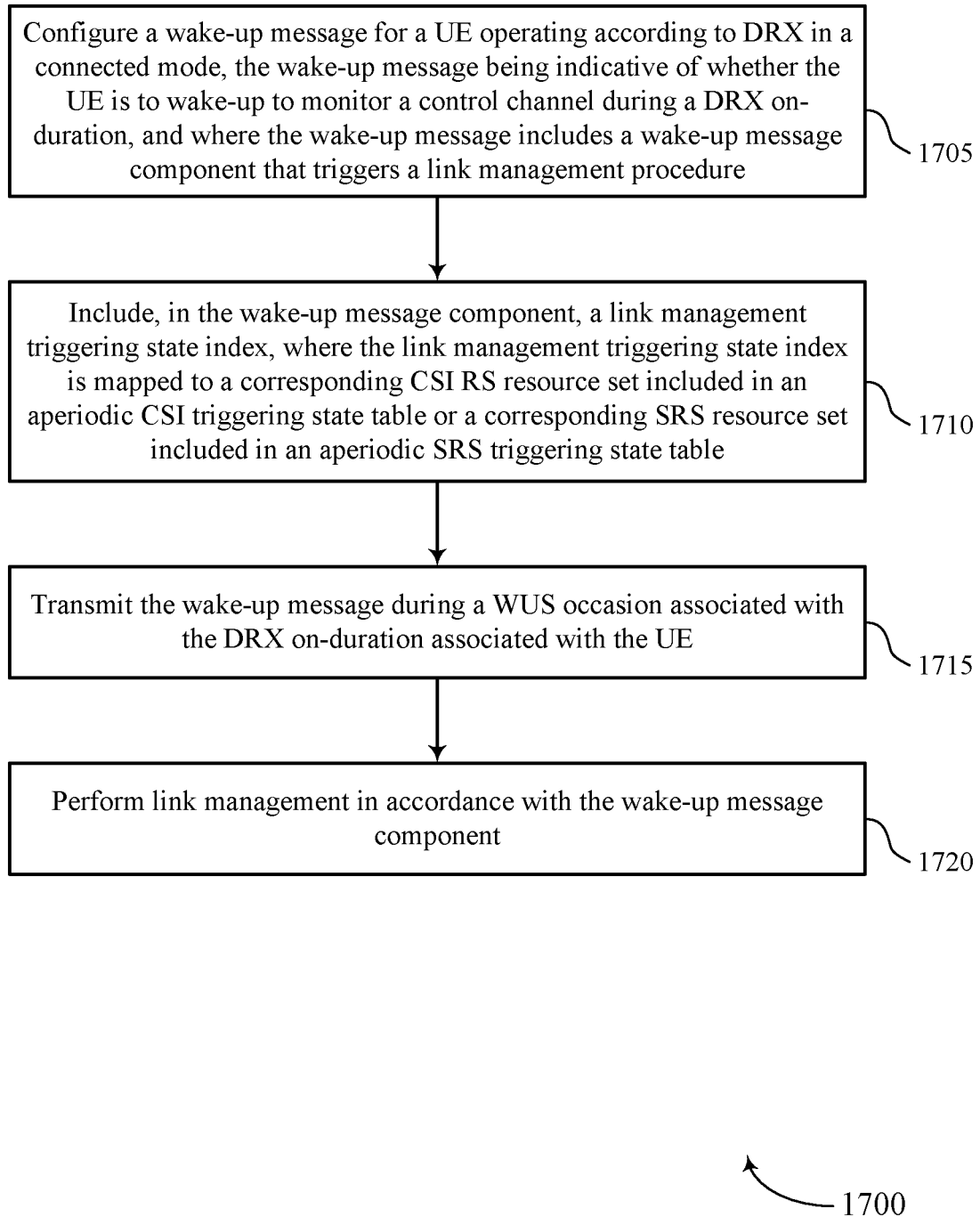

FIG. 17 shows a flowchart illustrating a method 1700 that supports WUS assisted link management in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may configure a wake-up message for a UE operating according to DRX in a connected mode, the wake-up message being indicative of whether the UE is to wake-up to monitor a control channel during a DRX on-duration, and where the wake-up message includes a wake-up message component that triggers a link management procedure. The operations of 1705 may be performed according to the methods described herein. In some examples, aspects of the operations of 1705 may be performed by a wake-up message configuration component as described with reference to FIGS. 10 through 13.

At 1710, the base station may include, in the wake-up message component, a link management triggering state index, where the link management triggering state index is mapped to a corresponding CSI RS resource set included in an aperiodic CSI triggering state table or a corresponding SRS resource set included in an aperiodic SRS triggering state table. The operations of 1710 may be performed according to the methods described herein. In some examples, aspects of the operations of 1710 may be performed by a link management index component as described with reference to FIGS. 10 through 13.

At 1715, the base station may transmit the wake-up message during a WUS occasion associated with the DRX on-duration associated with the UE. The operations of 1715 may be performed according to the methods described herein. In some examples, aspects of the operations of 1715 may be performed by a wake-up message transmission component as described with reference to FIGS. 10 through 13.

At 1720, the base station may perform link management in accordance with the wake-up message component. The operations of 1720 may be performed according to the methods described herein. In some examples, aspects of the operations of 1720 may be performed by a link management component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous examples or aspects described herein.

Example 1: A method for wireless communication at a user equipment (UE), comprising: monitoring, in a connected mode during discontinuous reception operation, a control channel during a wake-up signal occasion associated with a discontinuous reception on-duration; detecting a wake-up message during the wake-up signal occasion, the wake-up message being indicative of whether the UE is to wake-up to monitor the control channel during the discontinuous reception on-duration; identifying, from the wake-up message, a wake-up message component that triggers a link management procedure by the UE; and performing link management based at least in part on the wake-up message component.

Example 2: The method of example 1, further comprising: receiving, in advance of the wake-up signal occasion, an indication of a size of the wake-up message component.

Example 3: The method of any of examples 1 or 2, wherein the indication is UE-specific and is received via radio resource control (RRC) signaling or a medium access control (MAC) control element (CE) signaling.

Example 4: The method of any of examples 1 through 3, wherein identifying the wake-up message component that triggers the link management procedure comprises: identifying, from the wake-up message component, a link management triggering state index.

Example 5: The method of any of examples 1 through 4, further comprising: mapping the link management triggering state index to a corresponding channel state information (CSI) reference signal (RS) resource set included in an aperiodic CSI triggering state table or a corresponding sounding reference signal (SRS) resource set included in an aperiodic SRS triggering state table, wherein the aperiodic CSI triggering state table or the aperiodic SRS triggering state table uses a same mapping as a corresponding downlink control information (DCI) message to trigger link management.

Example 6: The method of any of examples 1 through 5, wherein the link management triggering state index maps to a first subset of a total number of CSI RS resource sets included in the aperiodic CSI triggering state table, a first subset of a total number of SRS resource sets included in the aperiodic SRS triggering state table, or a combination thereof.

Example 7: The method of any of examples 1 through 6, further comprising: receiving an indication of the first subset of the total number of CSI RS resource sets or of the total number of SRS resource sets via either radio resource control (RRC) signaling or a medium access control (MAC) control element (CE) signaling in advance of the wake-up signal occasion.

Example 8: The method of any of examples 1 through 7, wherein the wake-up message component includes k bits for encoding the link management triggering state index, and wherein the first subset includes a first $2^k$ CSI triggering states of the aperiodic CSI triggering state table.

Example 9: The method of any of examples 1 through 8, wherein the wake-up message component includes k bits for encoding the CSI triggering state index, and wherein the first subset includes a first $2^k$ CSI triggering state resource sets of the aperiodic CSI triggering state table that each satisfy a triggering offset beyond a triggering threshold when triggered.

Example 10: The method of any of examples 1 through 9, further comprising: mapping the link management triggering state index to a corresponding channel state information (CSI) reference signal (RS) resource set included in a CSI triggering state table, wherein the CSI triggering state table is different from a table to which a downlink control information (DCI) message maps in order to trigger link management.

Example 11: The method of any of examples 1 through 10, further comprising: mapping the link management triggering state index to a corresponding channel state information (CSI) reference signal (RS) resource set included in a CSI triggering state table, wherein the CSI triggering state table is different from a table to which a downlink control information (DCI) message maps in order to trigger link management, but includes one or more indices that reference a table to which the DCI message maps in order to trigger link management.

Example 12: The method of any of examples 1 through 11, wherein the corresponding CSI RS resource set to which the link management triggering state index is mapped includes a plurality of resource sets for differently-purposed CSI RSs.

Example 13: The method of any of examples 1 through 12, wherein performing link management comprises: identifying uplink reporting resources for reporting link management measurements; and transmitting one or more link management reports comprising the link management measurements using the uplink reporting resources.

Example 14: The method of any of examples 1 through 13, wherein the link management trigger is common to a group of UEs.

Example 15: The method of any of examples 1 through 14, wherein the uplink reporting resources are configured prior to the wake-up signal occasion, indicated via the wake-up message component, or any combination thereof.

Example 16: The method of any of examples 1 through 15, wherein the uplink reporting resources are configured prior to the wake-up signal occasion.

Example 17: The method of any of examples 1 through 16, wherein the uplink reporting resources are indicated via the wake up message component.

Example 18: An apparatus comprising at least one means for performing a method of any of examples 1 to 17.

Example 19: An apparatus for wireless communications comprising a processor; memory coupled with the processor; and instructions stored in the memory and executable by the processor to cause the apparatus to perform a method of any of examples 1 to 17.

Example 20: A non-transitory computer-readable medium storing code for wireless communications, the code comprising instructions executable by a processor to perform a method of any of examples 1 to 17.

Example 21: A method for wireless communication at a base station, comprising: configuring a wake-up message for a UE operating according to discontinuous reception in a connected mode, the wake-up message being indicative of whether the UE is to wake-up to monitor a control channel during a discontinuous reception on-duration, and wherein the wake-up message includes a wake-up message component that triggers a link management procedure; transmitting the wake-up message during a wake-up signal occasion associated with the discontinuous reception on-duration associated with the UE; and performing link management in accordance with the wake-up message component.

Example 22: The method of example 21, further comprising: transmitting, in advance of the wake-up signal occasion, an indication of a size of the wake-up message component.

Example 23: The method of any of examples 21 or 22, wherein the indication is UE-specific and is received via radio resource control (RRC) signaling or a medium access control (MAC) control element (CE) signaling.

Example 24: The method of any of examples 21 through 23, wherein configuring the wake-up message comprises: including, in the wake-up message component, a link management triggering state index, wherein the link management triggering state index maps to a corresponding channel state information (CSI) reference signal (RS) resource set included in an aperiodic CSI triggering state table or a corresponding sounding reference signal (SRS) resource set included in an aperiodic SRS triggering state table are used by the UE for communicating with the base station.

Example 25: The method of any of examples 21 through 24, wherein the aperiodic CSI triggering state table or the aperiodic SRS triggering state table is a same table to which a downlink control information (DCI) message maps in order to trigger link management.

Example 26: The method of any of examples 21 through 25, wherein the link management triggering state index maps to one of a first subset of a total number of CSI RS resource sets included in the aperiodic CSI triggering state table, a first subset of a total number of SRS resource sets included in the aperiodic SRS triggering state table, or a combination thereof.

Example 27: The method of any of examples 21 through 26, further comprising: transmitting an indication of the first subset of the total number of CSI RS resource sets or of the total number of SRS resource sets via either radio resource control (RRC) signaling or a medium access control (MAC) control element (CE) signaling in advance of the wake-up signal occasion.

Example 28: The method of any of examples 21 through 27, wherein the wake-up message component includes k bits for encoding the CSI triggering state index, and wherein the first subset includes a first $2^k$ CSI triggering state resource sets of the CSI triggering state table.

Example 29: The method of any of examples 21 through 28, wherein the wake-up message component includes k bits for encoding the link management triggering state index, and wherein the first subset includes a first $2^k$ CSI triggering states of the aperiodic CSI triggering state table that each satisfy a triggering offset beyond a triggering threshold when triggered.

Example 30: The method of any of examples 21 through 29, wherein the aperiodic CSI triggering state table is different from a table to which a downlink control information (DCI) message maps in order to trigger link management.

Example 31: The method of any of examples 21 through 30, wherein the aperiodic CSI triggering state table is different from a table to which a downlink control information (DCI) message maps in order to trigger link management, but includes one or more indices that reference a table to which a DCI message maps in order to trigger link management.

Example 32: The method of any of examples 21 through 31, wherein the corresponding CSI RS resource set to which the link management triggering state index is mapped includes a plurality of resource sets for differently-purposed CSI RSs.

Example 33: The method of any of examples 21 through 32, wherein configuring the wake-up message comprises: configuring the wake-up message component to apply to a group of UEs operating according to discontinuous reception in the connected mode, the group of UEs including the identified UE.

Example 34: The method of any of examples 21 through 33, wherein performing link management comprises: receiving one or more link management reports using uplink reporting resources configured by the base station prior to the wake-up signal occasion, indicated via the wake-up message component, or any combination thereof.

Example 35: The method of any of examples 21 through 34, wherein performing link management comprises: receiving one or more link management reports using uplink reporting resources configured by the base station prior to the wake-up signal occasion.

Example 36: The method of any of examples 21 through 35, wherein performing link management comprises: receiving one or more link management reports using uplink reporting resources indicated via the wake-up message component.

Example 37: An apparatus comprising at least one means for performing a method of any of examples 21 to 36.

Example 38: An apparatus for wireless communications comprising a processor; memory coupled with the processor; and instructions stored in the memory and executable by the processor to cause the apparatus to perform a method of any of examples 21 to 36.

Example 39: A non-transitory computer-readable medium storing code for wireless communications, the code comprising instructions executable by a processor to perform a method of any of examples 21 to 36.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    monitoring, in a connected mode during discontinuous reception operation, a control channel during a wake-up signal occasion associated with a discontinuous reception on-duration;
    detecting a wake-up message during the wake-up signal occasion, the wake-up message being indicative of whether the UE is to wake-up to monitor the control channel during the discontinuous reception on-duration;
    identifying, from the wake-up message, a wake-up message component that triggers a link management procedure by the UE, wherein the wake-up message component includes a link management triggering state index;
    mapping the link management triggering state index to a corresponding reference signal resource set included in a reference signal triggering state table; and
    performing link management based at least in part on the wake-up message component and the mapping.

2. The method of claim 1, further comprising:
    receiving, in advance of the wake-up signal occasion, an indication of a size of the wake-up message component.

3. The method of claim 2, wherein the indication is UE-specific and is received via radio resource control (RRC) signaling or a medium access control (MAC) control element (CE) signaling.

4. The method of claim 1, wherein mapping the link management triggering state index to a corresponding reference signal resource set comprises:
mapping the link management triggering state index to a corresponding channel state information (CSI) reference signal (RS) resource set included in an aperiodic CSI triggering state table or a corresponding sounding reference signal (SRS) resource set included in an aperiodic SRS triggering state table, wherein the aperiodic CSI triggering state table or the aperiodic SRS triggering state table uses a same mapping as a corresponding downlink control information (DCI) message to trigger link management.

5. The method of claim 4, wherein the link management triggering state index maps to a first subset of a total number of CSI RS resource sets included in the aperiodic CSI triggering state table, a first subset of a total number of SRS resource sets included in the aperiodic SRS triggering state table, or a combination thereof.

6. The method of claim 5, further comprising:
receiving an indication of the first subset of the total number of CSI RS resource sets or of the total number of SRS resource sets via either radio resource control (RRC) signaling or a medium access control (MAC) control element (CE) signaling in advance of the wake-up signal occasion.

7. The method of claim 5, wherein the wake-up message component includes k bits for encoding the link management triggering state index, and wherein the first subset includes a first $2^k$ CSI triggering states of the aperiodic CSI triggering state table.

8. The method of claim 5, wherein the wake-up message component includes k bits for encoding the CSI triggering state index, and wherein the first subset includes a first $2^k$ CSI triggering state resource sets of the aperiodic CSI triggering state table that each satisfy a triggering offset beyond a triggering threshold when triggered.

9. The method of claim 1, wherein mapping the link management triggering state index to a corresponding reference signal resource set comprises:
mapping the link management triggering state index to a corresponding channel state information (CSI) reference signal (RS) resource set included in a CSI triggering state table, wherein the CSI triggering state table is different from a table to which a downlink control information (DCI) message maps in order to trigger link management.

10. The method of claim 1, wherein mapping the link management triggering state index to a corresponding reference signal resource set comprises:
mapping the link management triggering state index to a corresponding channel state information (CSI) reference signal (RS) resource set included in a CSI triggering state table, wherein the CSI triggering state table is different from a table to which a downlink control information (DCI) message maps in order to trigger link management, but includes one or more indices that reference a table to which the DCI message maps in order to trigger link management.

11. The method of claim 10, wherein the corresponding CSI RS resource set to which the link management triggering state index is mapped includes a plurality of resource sets for differently-purposed CSI RSs.

12. The method of claim 1, wherein performing link management comprises:
identifying uplink reporting resources for reporting link management measurements; and
transmitting one or more link management reports comprising the link management measurements using the uplink reporting resources.

13. The method of claim 12, wherein the uplink reporting resources are configured prior to the wake-up signal occasion, indicated via the wake-up message component, or any combination thereof.

14. A method for wireless communication at a base station, comprising:
configuring a wake-up message for a UE operating according to discontinuous reception in a connected mode, the wake-up message being indicative of whether the UE is to wake-up to monitor a control channel during a discontinuous reception on-duration, and wherein the wake-up message includes a wake-up message component that triggers a link management procedure and includes a link management triggering state index that maps to a corresponding reference signal resource set included in a reference signal triggering state table;
transmitting the wake-up message during a wake-up signal occasion associated with the discontinuous reception on-duration associated with the UE; and
performing link management in accordance with the wake-up message component.

15. The method of claim 14, further comprising:
transmitting, in advance of the wake-up signal occasion, an indication of a size of the wake-up message component.

16. The method of claim 15, wherein the indication is UE-specific and is received via radio resource control (RRC) signaling or a medium access control (MAC) control element (CE) signaling.

17. The method of claim 14,
wherein the reference signal resource set comprises a corresponding channel state information (CSI) reference signal (RS) resource set included in an aperiodic CSI triggering state table or a corresponding sounding reference signal (SRS) resource set included in an aperiodic SRS triggering state table.

18. The method of claim 17, wherein the aperiodic CSI triggering state table or the aperiodic SRS triggering state table is a same table to which a downlink control information (DCI) message maps in order to trigger link management.

19. The method of claim 18, wherein the link management triggering state index maps to one of a first subset of a total number of CSI RS resource sets included in the aperiodic CSI triggering state table, a first subset of a total number of SRS resource sets included in the aperiodic SRS triggering state table, or a combination thereof.

20. The method of claim 19, further comprising:
transmitting an indication of the first subset of the total number of CSI RS resource sets or of the total number of SRS resource sets via either radio resource control (RRC) signaling or a medium access control (MAC) control element (CE) signaling in advance of the wake-up signal occasion.

21. The method of claim 19, wherein the wake-up message component includes k bits for encoding the CSI triggering state index, and wherein the first subset includes a first $2^k$ CSI triggering state resource sets of the CSI triggering state table.

22. The method of claim 19, wherein the wake-up message component includes k bits for encoding the link management triggering state index, and wherein the first subset includes a first $2^k$ CSI triggering states of the aperiodic CSI triggering state table that each satisfy a triggering offset beyond a triggering threshold when triggered.

23. The method of claim 18, wherein the aperiodic CSI triggering state table is different from a table to which a downlink control information (DCI) message maps in order to trigger link management.

24. The method of claim 18, wherein the aperiodic CSI triggering state table is different from a table to which a downlink control information (DCI) message maps in order to trigger link management, but includes one or more indices that reference a table to which a DCI message maps in order to trigger link management.

25. The method of claim 24, wherein the corresponding CSI RS resource set to which the link management triggering state index is mapped includes a plurality of resource sets for differently-purposed CSI RSs.

26. The method of claim 14, wherein configuring the wake-up message comprises:
configuring the wake-up message component to apply to a group of UEs operating according to discontinuous reception in the connected mode, the group of UEs including the identified UE.

27. The method of claim 14, wherein performing link management comprises:
receiving one or more link management reports using uplink reporting resources configured by the base station prior to the wake-up signal occasion, indicated via the wake-up message component, or any combination thereof.

28. An apparatus for wireless communication at a user equipment (UE), comprising: a processor, memory coupled with the processor; and instructions stored in the memory and executable by the processor to cause the apparatus to:
monitor, in a connected mode during discontinuous reception operation, a control channel during a wake-up signal occasion associated with a discontinuous reception on-duration;
detect a wake-up message during the wake-up signal occasion, the wake-up message being indicative of whether the UE is to wake-up to monitor the control channel during the discontinuous reception on-duration;
identify, from the wake-up message, a wake-up message component that triggers a link management procedure by the UE, wherein the wake-up message component includes a link management triggering state index;
map the link management triggering state index to a corresponding reference signal resource set included in a reference signal triggering state table; and
perform link management based at least in part on the wake-up message component and the mapping.

29. An apparatus for wireless communication at a base station, comprising: a processor, memory coupled with the processor; and instructions stored in the memory and executable by the processor to cause the apparatus to:
configure a wake-up message for a UE operating according to discontinuous reception in a connected mode, the wake-up message being indicative of whether the UE is to wake-up to monitor a control channel during a discontinuous reception on-duration, and wherein the wake-up message includes a wake-up message component that triggers a link management procedure and includes a link management triggering state index that maps to a corresponding reference signal resource set included in a reference signal triggering state table;
transmit the wake-up message during a wake-up signal occasion associated with the discontinuous reception on-duration associated with the UE; and
perform link management in accordance with the wake-up message component.

* * * * *